United States Patent
Inman et al.

(10) Patent No.: US 12,136,497 B2
(45) Date of Patent: Nov. 5, 2024

(54) FISSION REACTOR WITH SEGMENTED CLADDING BODIES HAVING CLADDING ARMS WITH INVOLUTE CURVE SHAPE

(71) Applicant: BWXT Advanced Technologies LLC, Lynchburg, VA (US)

(72) Inventors: James B. Inman, Forest, VA (US); Joshua J. Bergman, Valensole (FR)

(73) Assignee: BWXT Advanced Technologies LLC, Lynchburg, VA (US)

( * ) Notice: Subject to any disclaimer, the term of this patent is extended or adjusted under 35 U.S.C. 154(b) by 0 days.

(21) Appl. No.: 17/578,845

(22) Filed: Jan. 19, 2022

(65) Prior Publication Data
US 2022/0139576 A1    May 5, 2022

Related U.S. Application Data

(63) Continuation of application No. 17/032,007, filed on Sep. 25, 2020, now Pat. No. 11,289,212.
(Continued)

(51) Int. Cl.
*G21C 3/36*  (2006.01)
*G21C 3/04*  (2006.01)
(Continued)

(52) U.S. Cl.
CPC .............. *G21C 3/36* (2013.01); *G21C 3/042* (2013.01); *G21C 3/18* (2013.01); *G21C 3/30* (2013.01);
(Continued)

(58) Field of Classification Search
CPC ... G21C 3/36; G21C 3/18; G21C 3/30; G21C 3/042; G21C 5/16; G21C 3/16; G21C 5/06
(Continued)

(56) References Cited

U.S. PATENT DOCUMENTS 2,992,982 A    7/1961   Avery
3,105,807 A    10/1963  Blake
(Continued)

FOREIGN PATENT DOCUMENTS

JP    S38-016447 B1    1/1961
JP    S52-153096 A     12/1977
(Continued)

OTHER PUBLICATIONS

Extended European Search Report issued on Jul. 28, 2023 in European Application No. 20872198.5.
(Continued)

*Primary Examiner* — Jack W Keith
*Assistant Examiner* — Daniel Wasil
(74) *Attorney, Agent, or Firm* — Morgan, Lewis & Bockius LLP

(57) ABSTRACT

Plurality of layers form a nuclear fission reactor structure, each layer having an inner segment body, an intermediate segment body, and an outer segment body (each segment body separated by an interface). The layers include a plurality of cladding arms having involute curve shapes that spirally radiate outward from a radially inner end to a radially outer end. Chambers in the involute curve shaped cladding arm contain fuel compositions (and/or other materials such as moderators and poisons). The design of the involute curve shaped cladding arms and the composition of the materials conform to neutronic and thermal management requirements for the nuclear fission reactor and are of sufficiently common design and/or have sufficiently few variations as to reduce manufacturing complexity and manufacturing variability.

26 Claims, 13 Drawing Sheets

Related U.S. Application Data

(60) Provisional application No. 62/907,753, filed on Sep. 30, 2019.

(51) Int. Cl.

| | | |
|---|---|---|
| *G21C 3/18* | (2006.01) | |
| *G21C 3/30* | (2006.01) | |
| *G21C 5/16* | (2006.01) | |
| *G21C 3/06* | (2006.01) | |
| *G21C 3/16* | (2006.01) | |
| *G21C 5/06* | (2006.01) | |
| *G21C 21/02* | (2006.01) | |

(52) U.S. Cl.
CPC ............... *G21C 5/16* (2013.01); *G21C 3/06* (2013.01); *G21C 3/16* (2013.01); *G21C 5/06* (2013.01); *G21C 21/02* (2013.01)

(58) Field of Classification Search
USPC .................. 376/416, 432, 435, 455, 903
See application file for complete search history.

(56) References Cited

U.S. PATENT DOCUMENTS

| | | |
|---|---|---|
| 3,175,955 A | 3/1965 | Cheverton |
| 3,198,856 A | 8/1965 | Hammond et al. |
| 3,274,064 A | 9/1966 | Leonard |
| 3,276,963 A | 10/1966 | Pearce et al. |
| 4,134,791 A | 1/1979 | Delafosse |
| 4,764,339 A | 8/1988 | Lake et al. |
| 4,818,477 A | 4/1989 | Chubb |
| 11,923,098 B2 * | 3/2024 | Howe ............... G21C 3/36 |
| 2013/0308741 A1 * | 11/2013 | Kuran ............... G21C 3/326 |
| | | 376/435 |
| 2020/0156282 A1 | 5/2020 | Terrani et al. |

FOREIGN PATENT DOCUMENTS

| | | |
|---|---|---|
| JP | S56-133681 A | 10/1981 |
| JP | H01-172797 A | 7/1989 |
| JP | H07-120575 A | 5/1995 |
| JP | 2006-126147 A | 5/2006 |
| WO | 2019164617 A2 | 8/2019 |

OTHER PUBLICATIONS

Curtis, "Fluid Structure Interaction of Involute Fuel Plates in the High Flux Isotope Reactor Using a Fully-coupled Numerical Approach", Doctoral Dissertation, May 2018, pp. 5-6, online :<https://trace.tennessee.edu/cgi/viewcontent.cgi?article=6434&context=utk_graddiss>.

International Search Report and Written Opinion in PCT/US20/53007 dated Jan. 5, 2021.

Adam Ross Travis, "Simulating High Flux Isotope Reactor Core Thermal-Hydraulics via Interdimensional Model Coupling", Master's Thesis, University of Tennessee, 2014, https://trace.tennessee.edu/ulk_gradthes/2759.

Office Action dated Jun. 18, 2024, issued in corresponding Japanese Patent Application No. 2022-520139.

Extended European Search Report dated Sep. 12, 2024, issued in corresponding European Patent Application No. 24189588.7.

* cited by examiner

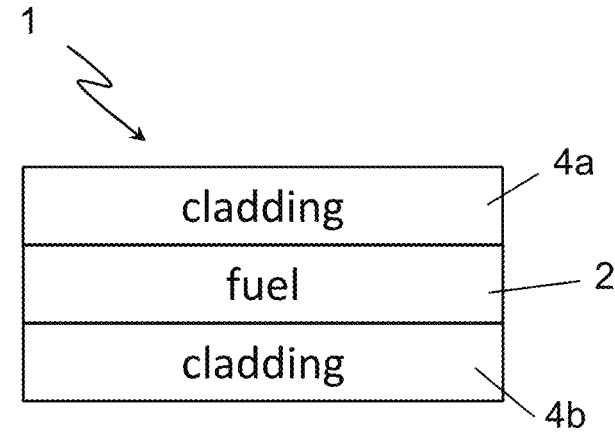
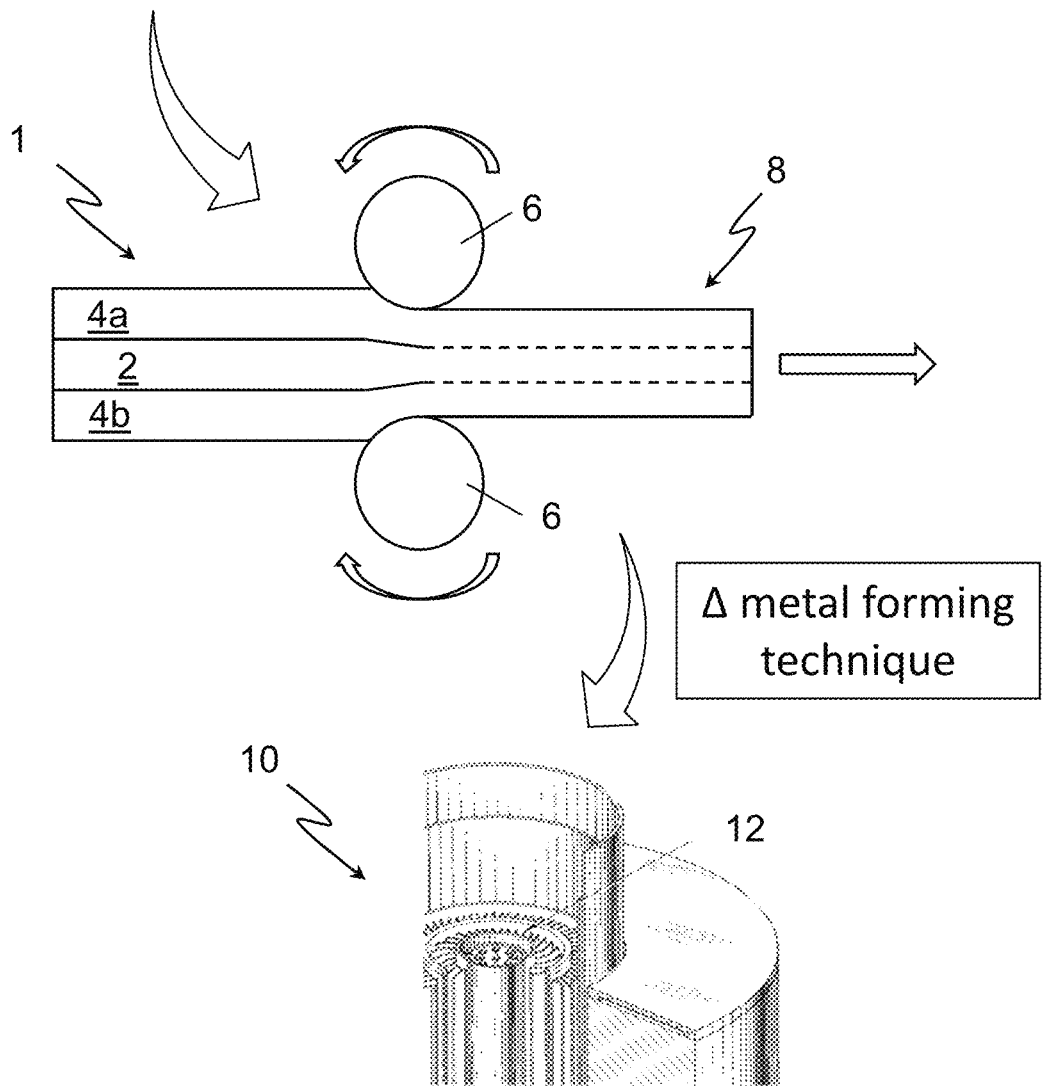
FIG. 1
(PRIOR ART)

FIG. 6A
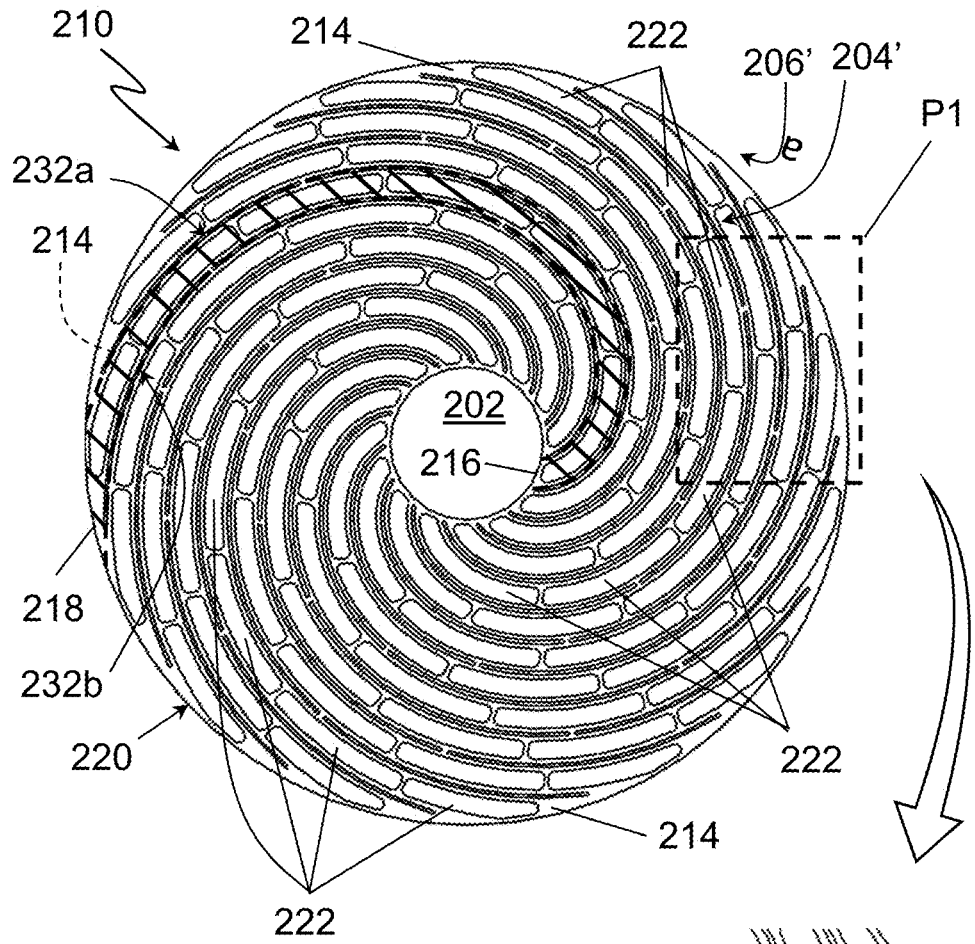
FIG. 6C
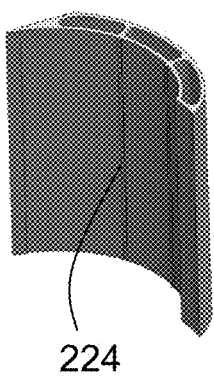
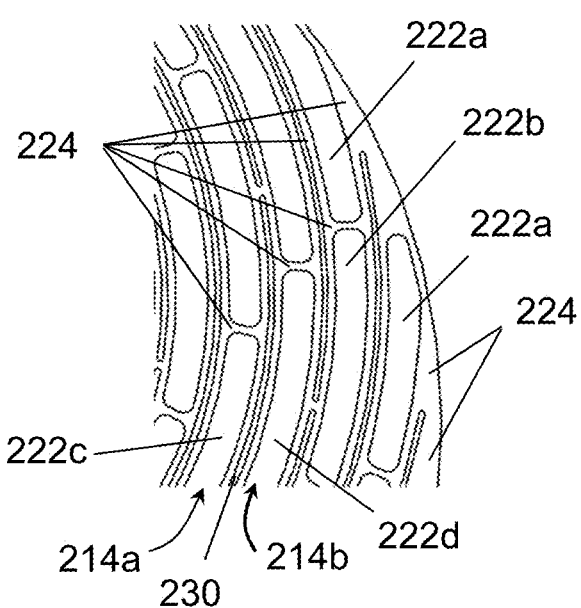
FIG. 6B

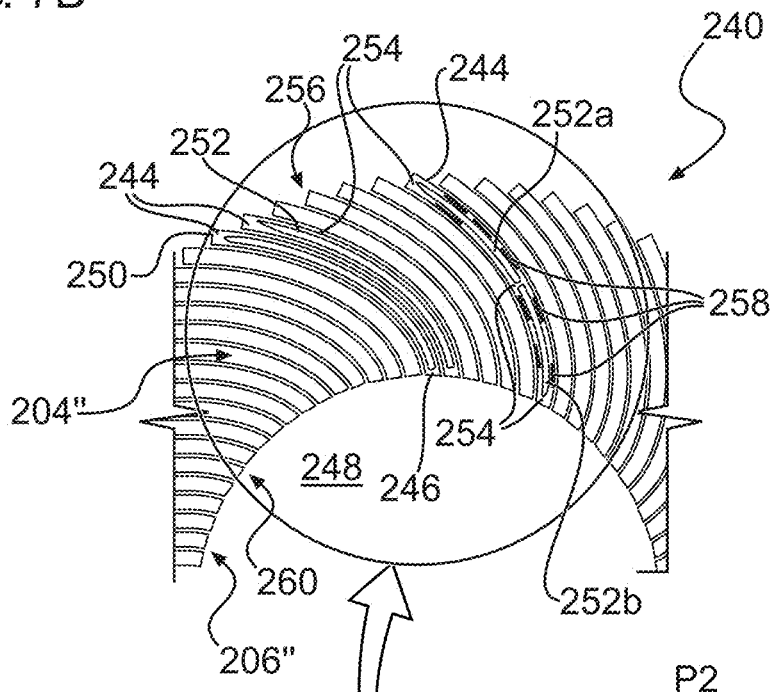
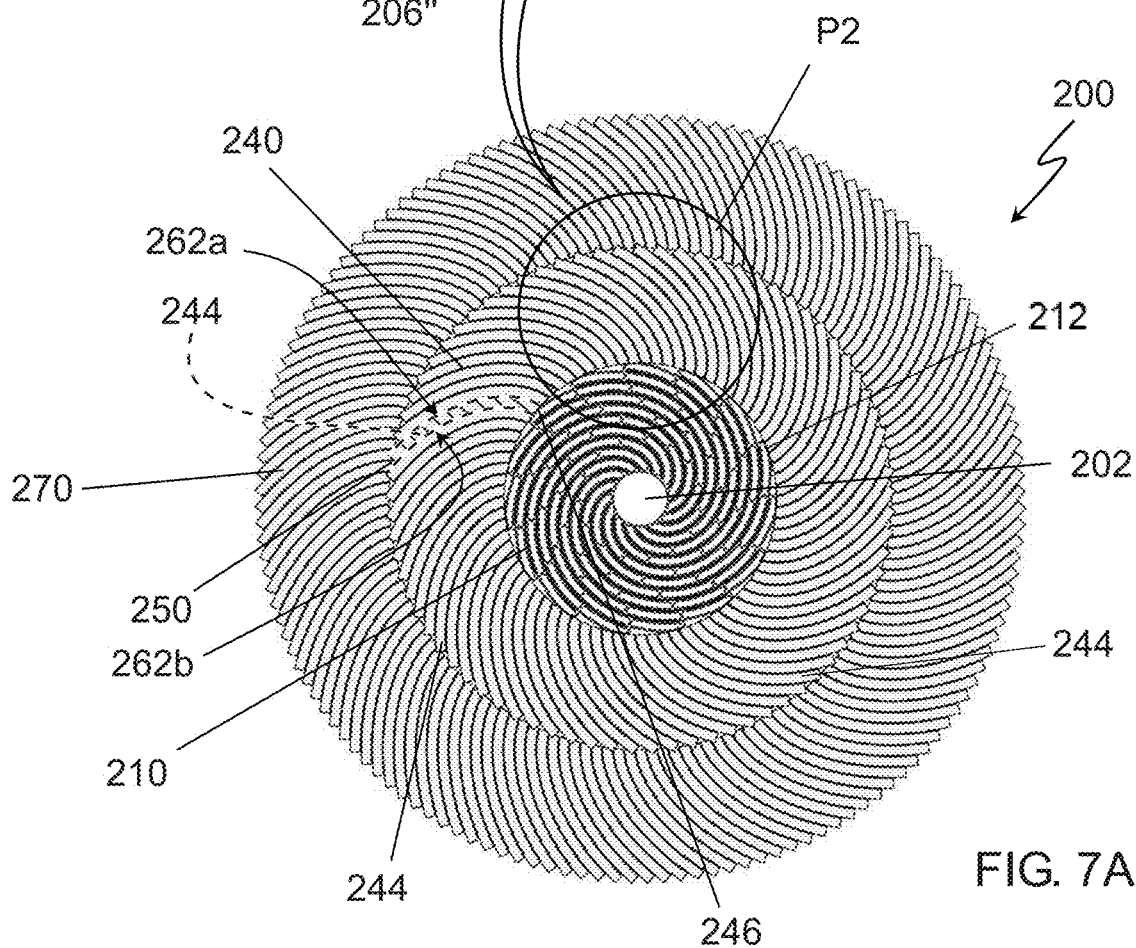
FIG. 7B
FIG. 7A

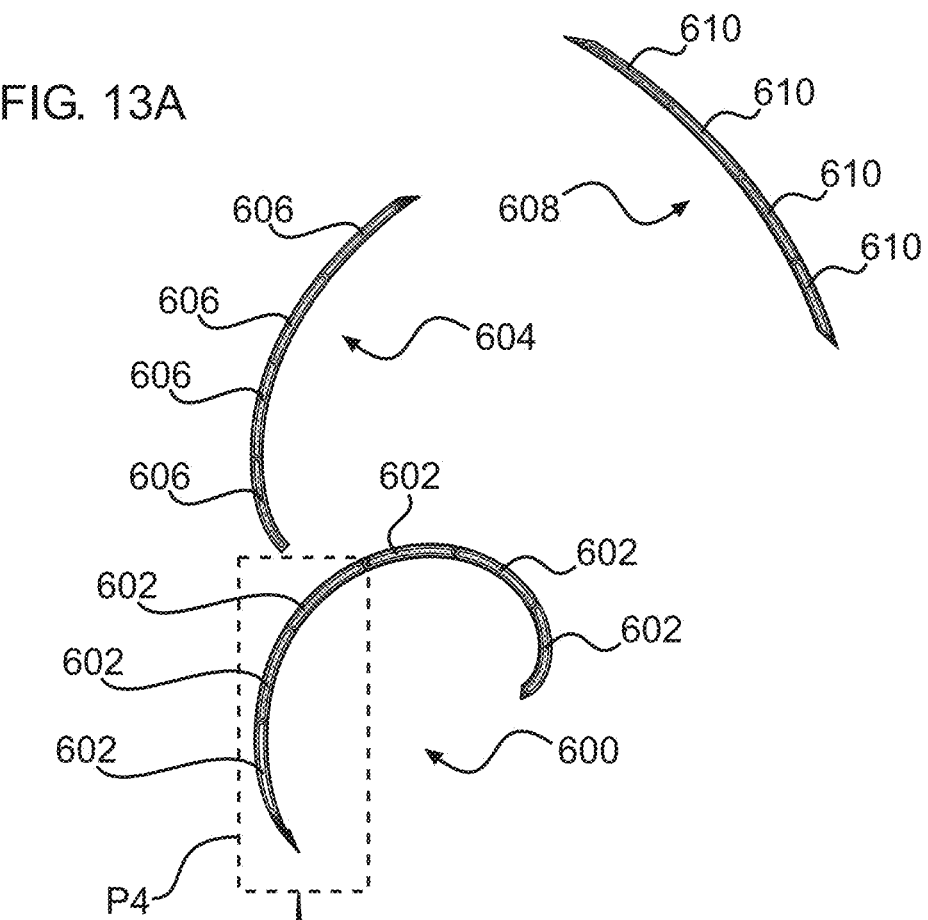

FIG. 14A
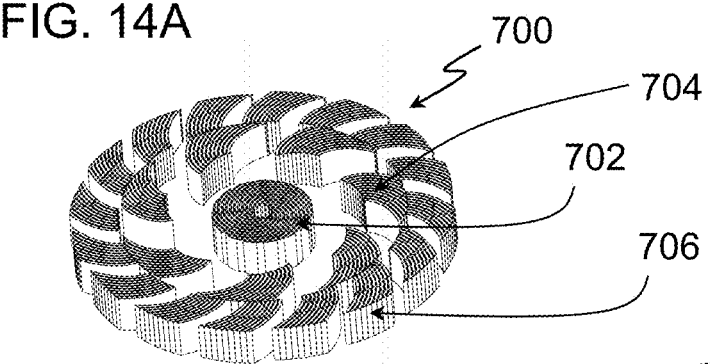
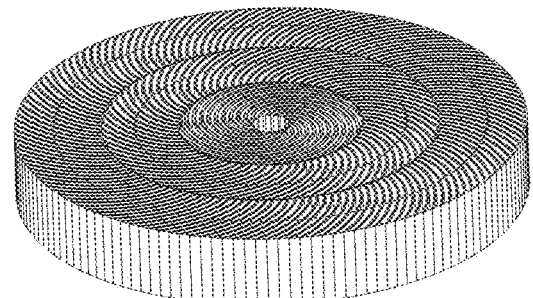
FIG. 14B
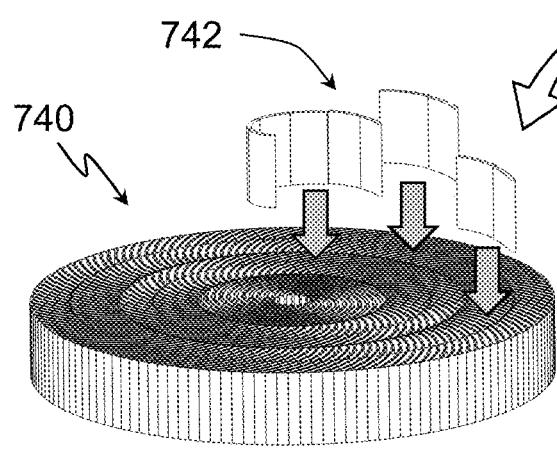
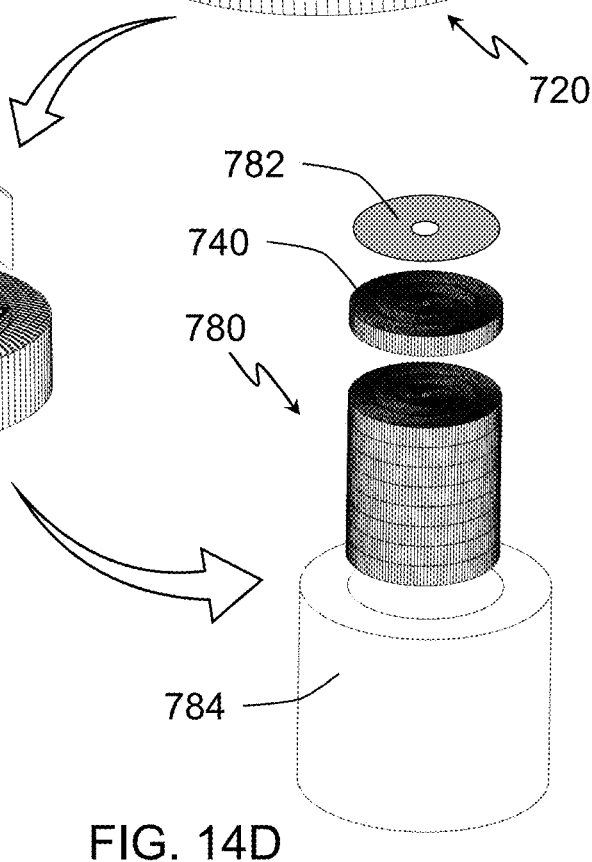
FIG. 14C
FIG. 14D

FISSION REACTOR WITH SEGMENTED CLADDING BODIES HAVING CLADDING ARMS WITH INVOLUTE CURVE SHAPE

RELATED APPLICATION DATA

This application is a continuation application of U.S. application Ser. No. 17/032,007, filed Sep. 25, 2020, and is based on and claims the benefit of priority of U.S. Provisional Application No. 62/907,753, filed Sep. 30, 2019, the entire contents of each of these applications are incorporated herein by reference.

TECHNICAL FIELD AND INDUSTRIAL APPLICABILITY

The present disclosure relates generally to fission reactors and structures related to the nuclear fission reactor space in fission reactors. In particular, a thermal generating structure, such as a fuel element containing a fissionable nuclear fuel composition, is encased by a containment structure, such as cladding. The thermal generating structure has an involute curve shape and a plurality of such shapes is assembled to form the cylindrical reactor layer. The involute curve shape varies based on a radial position with the cylindrical reactor layer, yet uniformity of the involute curve shapes minimizes the number of unique shapes for the fuel element (or other features, such as moderator materials and/or poisons) that are loaded into each thermal generating structure to achieve a desired reactor performance profile. The involute curve shape of the thermal generating structure allows for uniform thick fuel elements and cladding as well as uniform coolant spaces between the individual thermal generating structures. The present disclosure is particularly adapted for manufacture of at least the involute curve shape cladding structure of the thermal generating structure by an additive manufacturing process. The disclosed fission reactor is suitable for use in various applications, including as power sources on small vessels (such as space vessels and satellites), for nuclear thermal propulsion (NTP), and for isotope production.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

In designing new thermal generating features and structures for fission reactors, adequate cooling of each fuel element across the entire nuclear fission reactor space is often a limiting design factor. In one prior reactor design, uranium fuel has been encapsulated within rolled metal plates by, for example, a cold rolling process. With reference to the schematic illustration in FIG. 1, an arrangement of layers 1 that includes a fuel composition layer 2 between two clad layers (first clad layer 4a and second clad layer 4b) is feed into the nip of rollers 6 in a cold rolling apparatus. The cold rolling process reduces the thickness of the arrangement of layers 1 in one or more cold rolling steps from an initial thickness to a final thickness. In the process, the various layers of material (in the depicted example, the fuel composition layer 2 and the two clad layers 4a and 4b) are metallurgically bonded (indicated in FIG. 1 by a dashed line at the interface between fuel composition layer 2 and the two clad layers 4a and 4b) into a unitary layered structure 8 in which the clad layers 4a and 4b provide encapsulating layers on either side of the fuel composition layer 2 (shown in cross-section in FIG. 1). Whether formed as a strip or a plate, the unitary layered structure 8 can then be further processed using conventional metal forming techniques. In one example, such unitary layered structures 8 in the form of plates have been curved in the shape of an involute and assembled into a reactor core assembly of the High Flux Isotope Reactor (HFIR) 10, which is a nuclear research reactor located at Oak Ridge National Laboratory (ORNL) (a partial view of which is shown in FIG. 1, in cross-section). In the HFIR design, the involute shape 12 provided for uniform thick uranium/clad plates located between uniform coolant spaces.

The unitary layered structures and involute shapes in the HFIR have several drawbacks that reduce the flexibility of the design. For example, to conform to neutronic and thermal management requirements, the composition of the fuel composition layer 2 is spatially non-uniform relative to the location in the plate or strip as well as are tailored based on location within the reactor core assembly. But, at the same time, the compositions and distribution of layers of the unitary layered structure are fixed upon processing, e.g., cold rolling, of the fuel composition layer 2 and the two clad layers 4a and 4b. Therefore, the structure at each location in the HFIR has to have a uniquely constructed unitary layered structure and the uniquely constructed unitary layered structure are not otherwise interchangeable.

SUMMARY

Considering the above, it would be advantageous to have more flexibility in varying the shape, location, and composition of cladded fuel elements in a reactor core assembly. Furthermore, it would be advantageous to meet the requirements for neutronic and thermal management in fission nuclear reactor design with fewer geometric and compositional variations of cladded fuel elements while also reducing complexity of component fabrication and fission nuclear reactor assembly. Additionally, a design that is modular and repetitive and is of sufficiently sized dimensions can allow application of manufacturing methods, such as additive manufacturing.

Neutronics and thermal performance of fuel elements in core designs for fission nuclear reactors are influenced by, among other things, the structure, e.g., the shape, size and relative location, of fuel elements, cladding enclosing the fuel element, and coolant channels, and by the thermal transport properties of the fuel element, the cladding, and the coolant. As noted above, alternative designs are needed to increase design and manufacturing flexibility and reliability while still meeting neutronics and thermal performance of fuel elements.

One example of an alternative design (shown in FIG. 2) assembles layers (a 60 degree portion 30 of a layer is shown in FIG. 2) containing a series of radially concentric fuel rings 32 into a cylindrically shaped nuclear fission reactor space. In each fuel ring 32, an edge 34a and internal webbing 34b of the fuel ring function as cladding and defines a volume that contains a fuel composition 36 having a bowtie shape. The edge 34a and webbing 34b can also define the shape of the coolant channels 38, which in FIG. 2 have a circular shape in cross-section. The volume containing the fuel composition 36 has the same cross-sectional area in each of the fuel rings 32. Similarly, the coolant channels 38 in each fuel ring 32 have the same cross-sectional area. For neutronics and thermal management purposes, each fuel ring 32 requires a different fuel composition (for a constant fuel cross-sectional area) or a different fuel shape (for a constant fuel composition). For example, a fuel composition sized to fit in ring 32b cannot be used in ring 32f and also successfully operate from the viewpoint of neutronics and thermal management. Thus, in further example, the ten ring design shown in FIG. 2 would require a number of different fuels varying in one or more of fuel composition and fuel shape.

Another example of an alternative design (shown in FIGS. 3A and 3B) assembles layers (a 15 degree portion 50 of a layer is shown in FIGS. 3A and 3B) containing pockets 52 for a fuel element 54 that are distributed concentrically and radially within the portion 50. A plurality of portions 50 can be assembled into a cylindrically shaped nuclear fission reactor space. As compared to the example in FIG. 2, the example in FIGS. 3A and 3B changed the shape of the fuel element 54 from a bowtie shape to a more triangular or rectangular shape. Elliptical coolant holes 56 are located in the clad web structure 58 between each pocket 52. Similar to the example in FIG. 2, each differently sized and located fuel elements 54 require a different fuel composition or a different fuel shape and, overall, the example in FIGS. 3A and 3B would also require a sufficiently large number of different fuels varying in one or more of fuel composition and fuel shape (although changing from a bowtie shape to a more triangular or rectangular shape would simplify the manufacture of such components as well as simplify production of such components with varying fuel compositions). However, neutronics and thermal performance analysis for the design shown in FIGS. 3A and 3B demonstrated that, of the various different shapes and locations for the fuel elements, the only fuel element shape that was capable of being adequately cooled was the thinly shaped fuel element 54a at the radially outermost position, i.e., the fuel element with the largest length-to-width ratio.

The above two examples demonstrate the challenges in designing thermal generating features and structures for fission reactors in which the structures satisfy neutronics and thermal performance criteria and are of sufficiently common design and/or have sufficiently few variations as to reduce manufacturing complexity and manufacturing variability (and thereby reduce the probability for manufacturing defects).

In general, the disclosure is directed to a nuclear fission reactor structure in which the fuel elements containing a fissionable nuclear fuel composition are positioned along an axis of a enclosing cladding structure that has a shape of an involute curve. A plurality of such involute curve shaped cladding structures are arranged to form a ring and multiple concentric rings are arranged to form a layer of the nuclear fission reactor structure. Multiple layers are themselves assembled to form the nuclear fission reactor structure. In exemplary embodiments, the nuclear fission reactor structure is an active core region of a nuclear fission reactor.

Embodiments disclosed herein include a nuclear fission reactor structure comprising a plurality of layers. Each layer of the plurality of layers includes: an inner segment body including an inner opening extending axially from a first side of the inner segment body to a second side of the inner segment body, an intermediate segment body radially outward of the inner segment body, and an outer segment body radially outward of the intermediate segment body. A first interior interface separates the inner segment body and the intermediate segment body and a second interior interface separates the intermediate segment body and the outer segment body. In a cross-sectional plan view in a plane perpendicular to the axially extending inner opening: the inner segment body includes a plurality of inner cladding arms having a first involute curve shape that spirally radiates outward from a first radially inner end adjacent to the inner opening to a first radially outer end at the first interior interface, the intermediate segment body includes a plurality of intermediate cladding arms having a second involute curve shape that spirally radiates outward from a second radially inner end adjacent to the first interior interface to a second radially outer end at the second interior interface, and the outer segment body includes a plurality of outer cladding arms having a third involute curve shape that spirally radiates outward from a third radially inner end adjacent to the second interior interface to a third radially outer end at a radially outer surface of the outer segment body.

Embodiments disclosed herein also include a nuclear fission reactor comprising a plurality of layers as disclosed herein. The plurality of layers are assembled into a nuclear fission reactor structure with a first end surface, a second end surface, and an outer side surface connecting the first end surface to the second end surface. Also included are a radial reflector positioned about the outer side surface of the active core structure, a pressure vessel, and a coolant system in fluid communication with the active core structure through openings in the pressure vessel.

Embodiments disclosed herein also include a method of fabricating a nuclear fission reactor structure as disclosed herein. The method comprises manufacturing the inner segment body, segments of the intermediate segment body, and segments of the outer segment body, wherein each of the plurality of inner cladding arms, the plurality of intermediate cladding arms, and the plurality of outer cladding arms include a plurality of chambers; assembling the inner segment body, the segments of the intermediate segment body, and the segments of the outer segment body into a layer, wherein the segment bodies are assembled by one of welding and bonding; positioning one of a fissionable fuel composition and a moderator material in the plurality of chambers to form a fuel-loaded layer; and assembling a plurality of fuel-loaded layers into the nuclear fission reactor structure.

In an alternative embodiment, of a method of fabricating a nuclear fission reactor structure as disclosed herein, the method comprises manufacturing a layer including the inner segment body, the intermediate segment body, and the outer segment body as a unitary structure, wherein each of the plurality of inner cladding arms, the plurality of intermediate cladding arms, and the plurality of outer cladding arms include a plurality of chambers; positioning one of a fissionable fuel composition and a moderator material in the plurality of chambers to form a fuel-loaded layer; and assembling a plurality of fuel-loaded layers into the nuclear fission reactor structure.

Additionally, although the disclosed reactor and core have complex mechanical geometries, integral and iterative manufacturing on a layer-by-layer basis using additive manufacturing techniques, such as 3D printing, of elemental metal or metal alloys enables the structure and features disclosed herein to be more easily manufactured.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

FIG. 1 schematically illustrates structures and processes associated with forming cladded fuel structures in a prior art High Flux Isotope Reactor (HFIR).

FIG. 6A schematically illustrates in a top view an embodiment of an inner segment body and FIG. 6B shows a magnified view of a portion of the inner segment body shown in FIG. 6A.

FIG. 6C illustrates an example of a surface feature on an edge of a cladding arm.

FIG. 7A schematically illustrates in a top view an embodiment of an intermediate segment body and FIG. 7B shows a magnified view of a portion of the intermediate segment body shown in FIG. 7A.

FIG. 13A shows results of thermal analysis studies on the involute curve shaped cladding arm design disclosed herein and FIG. 13B shows a magnified view of a portion of the inner segment cladding arm shown in FIG. 13A.

FIGS. 14A-D is a flow diagram graphical illustrating steps in the assembly of a layer from the various portions of the segmented bodies (FIG. 14A-B, the loading of a fuel composition and/or moderator composition and poisons into the layer (FIG. 14C), and the assembly of multiple layers into a nuclear fission reactor structure (FIG. 14D).

Figure 2:
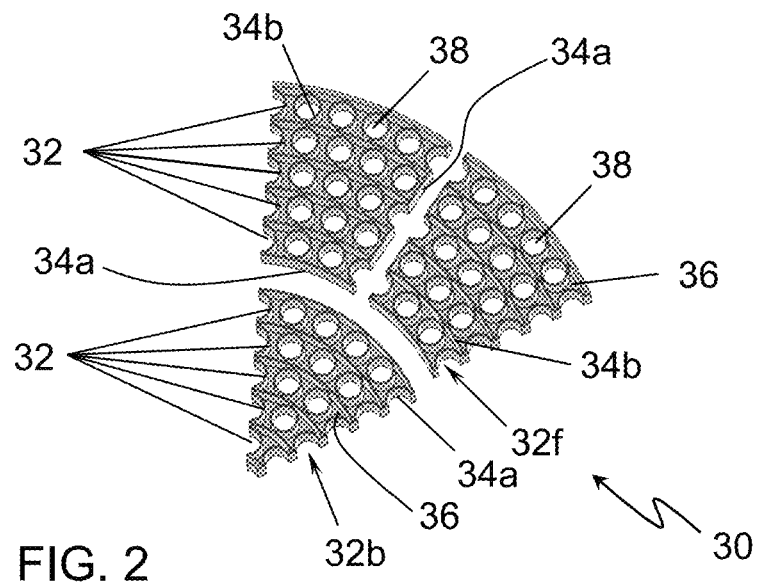
FIG. 2 schematically illustrates a first embodiment in which a 60 degree portion of layer of a design in which the assembled layers contain a series of radially concentric fuel rings.
Figures 3A, 3B:
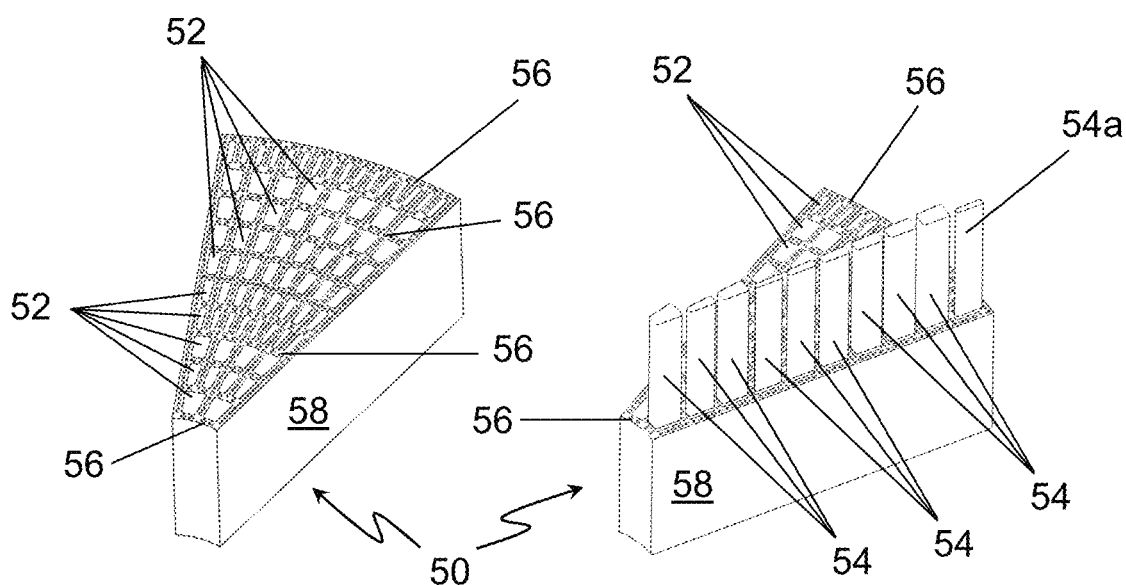
FIG. 3A schematically illustrates a second embodiment in which a 15 degree portion of a layer of a design with pockets for a fuel element that are distributed concentrically and radially and FIG. 3B schematically illustrates the same portion with fuel elements partially inserted into the pockets.

For ease of viewing, in some instances only some of the named features in the figures are labeled with reference numerals.

DETAILED DESCRIPTION

Figure 4:
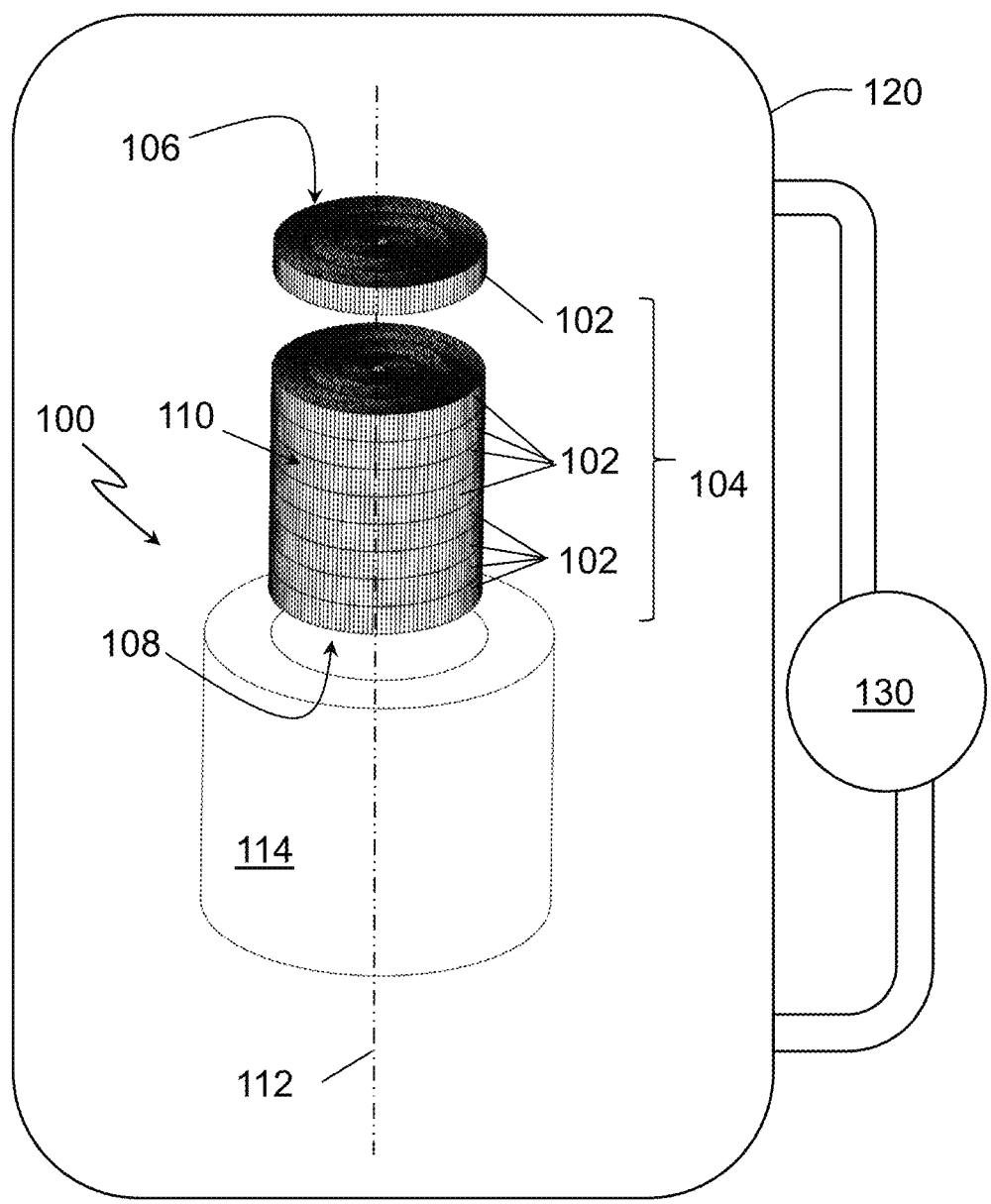
FIG. 4 schematically illustrates in perspective, partial disassembled view a simplified example of a nuclear fission reactor in which the active core region is assembled from layers of a third embodiment having a series of concentric segment bodies each of which include cladding arms having a first involute curve shape.

FIG. 4 schematically illustrates in perspective, partial disassembled view a simplified example embodiment of a nuclear fission reactor 100. The nuclear fission reactor 100 comprises a plurality of layers 102 assembled into a nuclear fission reactor core structure 104 with a first end surface 106, a second end surface 108, and an outer side surface 110 connecting the first end surface 106 to the second end surface 108 arranged along a longitudinal axis 112 of the active core structure 104. The layers 102 are defined by an inner segment body, an intermediate segment body, an outer segment body, an first interior interface, and a second interior interface as described further herein. The nuclear fission reactor 100 also comprises a radial reflector 114 positioned about the outer side surface 110 of the active core structure 104. The active core structure 104 is shown with a cylindrical structure, but any suitable geometric shape can be utilized as long as the active core structure displays suitable neutronic and thermal management characteristics. In exemplary embodiments, the active core structure 104 has sufficient layers 102 so that the ratio of the length of the active core region ($L_{RX}$) to the diameter of the active core structure ($D_{RX}$) is approximately 1

$$\left(\text{i.e, } \frac{L_{RX}}{D_{RX}} = 1 \pm .05\right).$$

In general, the radial reflector 114 reduces the neutron leakage of the nuclear fission reactor 100 by scattering back into the core (or reflecting) neutrons that would otherwise escape, which increases the effective multiplication factor ($k_{eff}$) of the design and reduces the amount of fuel necessary to maintain criticality. A pressure vessel and a coolant system in fluid communication with the active core structure through openings in the pressure vessel (shown schematically as pressure vessel 120 and coolant system 130) are also provided.

Any suitable radial reflector, pressure vessel and coolant system can be incorporated into the nuclear fission reactor 100. For example, the coolant system can be liquid-based or gas-based. When the coolant system is gas-based, the plurality of layers 102 can be assembled into the active core structure 104 by welding adjacent layers 102 together with weld joints at the outer circumferential surface, i.e., the interface corresponding to the outer side surface 110 of adjacent layers 102, and at the inner diameter surface so as to provide a gas-tight, open cylindrical shape having, in cross-section, an annulus shape. For gas-based coolant systems, having only the outermost surfaces gas-tight is sufficient as gas circulating throughout the active core region is acceptable. When the coolant system is liquid-based, the facing surfaces of adjacent layers 102 are bonded to each other such that the coolant channels are separate from each other while each providing a continuous path for coolant to traverse the active core structure from the first end to the second end.

To assist in aligning features, such as coolant channels, in one layer 102 with features in an adjacent layer 102, alignment aids can be used. For example, clocking techniques can be applied that use projecting registry features on a surface of one layer 102 that mate with or insert, for example by inserting into or being received by, receiving spaces on an abutting surface of the adjacent layer 102. Other registry features can also be used including pins, notches, shaped projections and so forth. In addition, other alignment aids such as alignment channels or scribe marks can be used. Also, the alignment aids can be located at one or more of various suitable surfaces, including abutting internal surfaces and continuous outer side surfaces 110.

Figure 5:
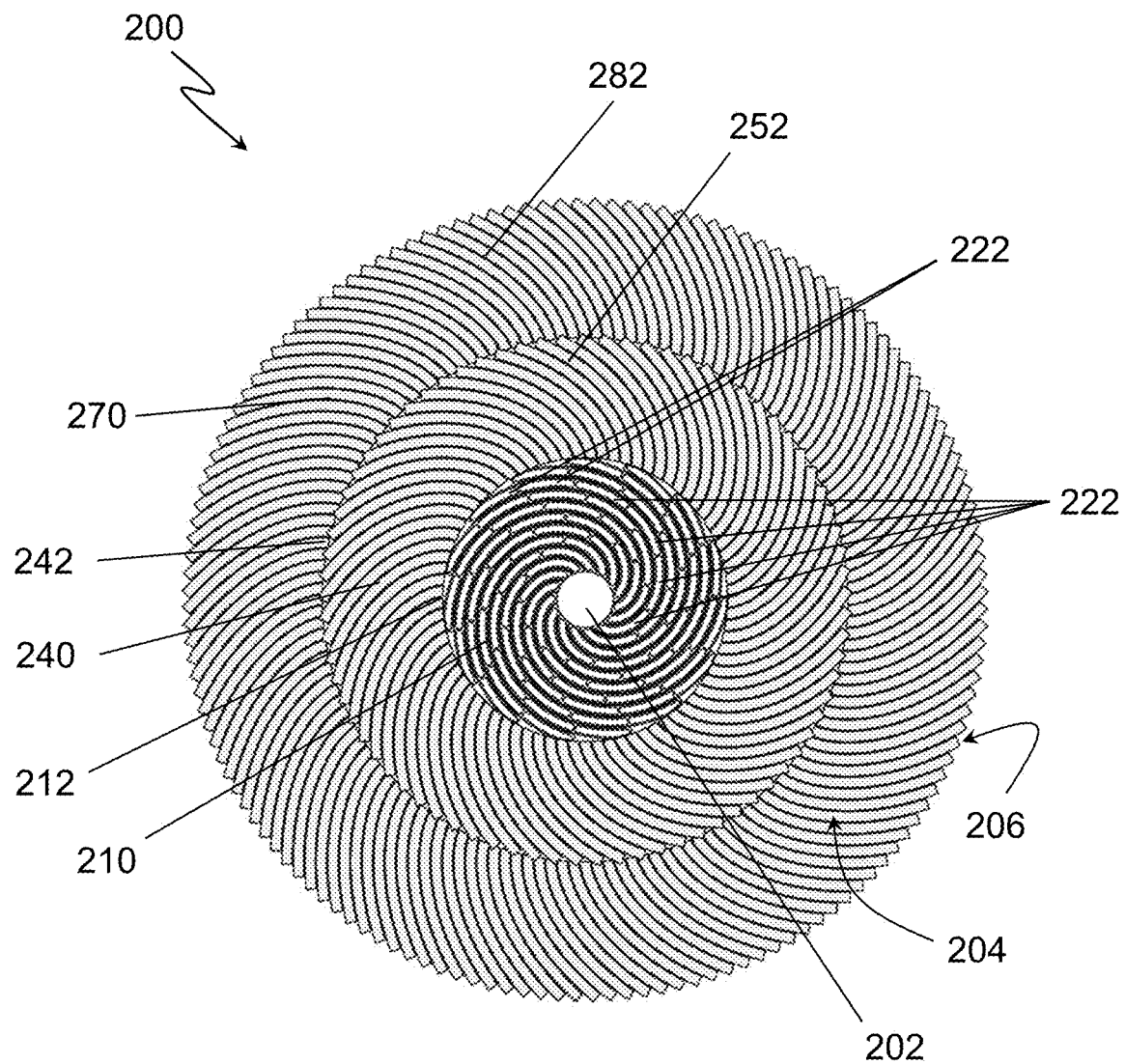
FIG. 5 schematically illustrates in a top view a series of concentric segment bodies, each of which include cladding arms having an involute curve shape, assembled into a layer.

The disclosed nuclear fission reactor structure comprises a plurality of layers, each layer including a series of concentrically arranged segment bodies and each segment body including cladding arms having an involute curve shape. FIG. 5 schematically illustrates in a top view a series of concentric segment bodies 210, 240, 270 each of which include cladding arms having a first involute curve shape, assembled into a layer 200. In exemplary embodiments, the nuclear fission reactor structure comprises an inner segment body 210, an intermediate segment body 240, and an outer segment body 270. The intermediate segment body 240 is radially outward of the inner segment body 210 and the outer segment body 270 is radially outward of the intermediate segment body 240. Interfaces separate one segment body from a sequentially, radially-adjacent segment body. For example, a first interior interface 212 separates the inner segment body 210 and the intermediate segment body 240 and a second interior interface 242 separates the intermediate segment body 240 and the outer segment body 270.

The nuclear fission reactor structure includes an inner opening that axially extends from a first axial end of the nuclear fission reactor structure to a second axial end of the nuclear fission reactor structure (typically corresponding to a longitudinal axis of the nuclear fission reactor structure). This inner opening can function as a coolant channel, but can also function (in combination with or exclusive from a coolant channel) to house reactor control equipment, control rods, sensors, or radioisotope production equipment. Each layer has a corresponding inner opening that, when multiple layers are assembled into the nuclear fission reactor structure, defines a portion of the inner opening.

FIG. 5 shows an embodiment of a layer 200, in a top view relative to the layer and in a cross-sectional, plan view relative to an assembled nuclear fission reactor structure, in each case in a plane perpendicular to an axis of the axially extending inner opening 202. The layer 200 includes an inner segment body 210 including an inner opening 202 extending axially from a first side 204 of the layer 200 to a second side 206 of the layer 200. The layer 200 also includes an intermediate segment body 240 radially outward of the inner segment body 210 and an outer segment body 270 radially outward of the intermediate segment body 240. The concentrically arranged segment bodies 210, 240, 270 are joined to each other to form the layer 200 at interfaces. The segment bodies can be joined and the interfaces formed by any suitable means. In some embodiments, segment bodies are joined and the interfaces formed by welding; in other embodiments, segment bodies are joined and the interfaces formed by compression fitting. In each case, a first interior interface 212 separates the inner segment body 210 and the intermediate segment body 240 and a second interior interface 242 separates the intermediate segment body 240 and the outer segment body 270.

FIG. 6A shows an embodiment of an inner segment body 210, in a top view relative to the inner segment body 210 and in a cross-sectional, plan view relative to an assembled nuclear fission reactor structure, in each case in a plane perpendicular to an axis of the axially extending inner opening 202. FIG. 6B shows a magnified view of a portion P1 of inner segment body 210 shown in FIG. 6A. The inner segment body 210 includes a plurality of inner cladding arms 214 having a first involute curve shape that spirally radiates outward from a first radially inner end 216 adjacent to the inner opening 202 to a first radially outer end 218 at the outer edge 220 that will form or be part of the first interior interface 212 in the assembled layer 200. The plurality of inner cladding arms 214 include a plurality of chambers 222. The plurality of chambers 222 are distributed along the length of the inner cladding arm 214. Each chamber 222 is contained within a web 224 of the material that forms the inner segment body 210 such that, in each cladding arm 214, each chamber 222 is enclosed by the web 224 and a first chamber 222a is separated from an adjacent chamber 222b by a portion of the web 224. As described herein, the chambers 214 can contain a fissionable fuel composition (or other compositions, such as moderator materials and poisons) and the web 224 functions as cladding for the fissionable fuel composition or other compositions.

One or more coolant openings 230 are located between the plurality of chambers 222 in one cladding arm 214 and the plurality of chambers 222 in an adjacent inner cladding arm 214 (such as chamber 222c in one inner cladding arm 214a and chamber 222d in adjacent inner cladding arm 214b (see FIG. 6B)). The coolant openings 230 extend through the inner cladding arm 214 in the direction of the thickness of the inner segment body 210 from a first side 204' of the inner segment body 210 to a second side 206' of the inner segment body 210.

The coolant openings 230 can be of various forms. For example, where the web 224 of the inner segment body 210 is a unitary body, the coolant openings 230 are one or more passages, channels or other openings that can be formed in the web during initial web manufacturing, e.g., during the layer-by-layer deposition process of an additive manufacturing process, or can be formed in the web, post-web manufacturing, by a material removal process such as drilling, milling, plunge milling, or using an electrical discharge machining (EDM) process. In another example, where each cladding arm 214 is formed as a unitary body and the plurality of cladding arms 214 are joined to form the inner segment body 210, the coolant openings 230 are passages or other openings that are formed by features in the edges of the inner cladding arm 214, i.e., the edges bounded by the surface of the inner cladding arm 214 forming the first side 204' of the inner segment body 210, the surface of the inner cladding arm 214 forming the second side 206' of the inner segment body 210, the surface of the first radially inner end 216 of the inner cladding arm 214, and the surface of the first radially outer end 218 of the inner cladding arm 214. In this regard, the edges of the cladding arm 214 can include grooves, ribs, protrusions or other surface features that, when contacted by an edge of an adjacent cladding arm 214, form one or more passages, channels or other openings.

In some embodiments, the surface features are discreet areas located along the periphery of the edges; in other embodiments, the surface features extend along at least one opposing side surface either continuously or discontinuously from a first end oriented toward the first side of the inner segment body to a second end oriented toward the second side of the inner segment body. Combinations of different surface features can also be implemented. Additionally, surface features may be present on only one of the edges of the cladding arm or may be located on both edges of the cladding arm. In one example, the surface feature is a protrusion. Non-limiting examples of protrusions include features resembling bumps, knobs, or mesa-like features, both regularly and irregularly shaped.

The surface feature has a top surface distal from the at least one opposing side surface from which the protrusion projects. When assembled in the segment body with an immediately adjacent cladding arm, the top surface of the protrusion contacts an opposing side surface on the immediately adjacent cladding arm and the height or projection distance of the protrusion provides a stand-off separation between the two cladding arms. This stand-off separation forms a channel between the two cladding arms. When present, in some embodiments, such surface features can be offset along the radially extending length of the cladding arm 214 such that the location of the surface features are not coincident to the portion of the web 224 separating a first chamber 222a from an adjacent chamber 222b. Combinations of different coolant openings can also be implemented. As an example, FIG. 6C illustrates a surface feature (in this case a rib 234) on an edge of a cladding arm, (in this case, an example of an inner cladding arm 214). However, surface features can similarly be present on either or both edge surfaces as well as on one or more of the inner cladding arm 214, the intermediate cladding arm 244, and the outer cladding arm 272.

In some embodiments, it is preferred that the inner segment body 210 is formed as a unitary body so as to avoid a weld or other structure on the surface forming the inner diameter of the opening 202 that would otherwise be present from joining individual cladding arms 214 or groups of cladding arms 214.

For ease of viewing the involute curve shape of inner cladding arm 214, an embodiment of an inner cladding arm 214 is outlined in FIG. 6A. In the illustrated embodiment, the two curving sides 232a, 232b of the involute curve shape of the inner cladding arm 214 are located at a line connecting the mid-points in the web 224 located between the plurality of chambers 222 in one cladding arm 214 and the plurality of chambers 222 in an adjacent inner cladding arm 214. The involute curve shape itself may be of constant width (i.e., where width is the distance between the two opposing curving sides 232a, 232b of the involute curve shape of the inner cladding arm 214) as a function of location along an axis of the involute curve shape extending from a midpoint of the first radially inner end 216 to a midpoint of first radially outer end 218. Alternatively, the involute curve shape may be of varying width as a function of location along an axis of the involute curve shape extending from the midpoint of the first radially inner end 216 to the midpoint of the first radially outer end 218. For example, the involute curve shape may be of a constantly increasing width or constantly decreasing width as a function of location along an axis of the involute curve shape extending from the midpoint of the first radially inner end 216 to the midpoint of the first radially outer end 218.

FIG. 7A shows an embodiment of an intermediate segment body 240, in a top view relative to the intermediate segment body 240 and in a cross-sectional, plan view relative to an assembled nuclear fission reactor structure, in each case in a plane perpendicular to an axis of the axially extending inner opening 202. FIG. 7B shows a magnified view of a portion P2 of intermediate segment body 240 shown in FIG. 7A. In FIG. 7A, the intermediate segment body 240 is shown in the context of the inner segment body 210 and outer segment body 270 forming the layer 200.

The intermediate segment body 240 includes a plurality of inner cladding arms 244 having a second involute curve shape that spirally radiates outward from a second radially inner end 246 adjacent to an inner opening 248, which will form or be part of the first interior interface 212 in the assembled layer 200, to a second radially outer end 250 at the outer edge 256, which will form or be part of the second interior interface 242 in the assembled layer 200. The plurality of intermediate cladding arms 244 include at least one chamber 252, alternatively a plurality of chambers 252a, 252b (see also, e.g., FIGS. 9 and 10). In FIG. 7B, the chambers 252 are only shown in two intermediate cladding arms 244, but additional intermediate cladding arms 244, alternatively all the intermediate cladding arms 244 can include one or more chambers 252. The chamber 252 extends along the length of the intermediate cladding arm 244 or, where a plurality of chambers is included, the chambers 252a, 252b are distributed along the length of the intermediate cladding arm 244. The chamber 252 (or, where a plurality of chambers is included, the chambers 252a, 252b) is contained within a web 254 of the material that forms the intermediate segment body 240 such that, in each intermediate cladding arm 244, the individual chamber 252 is enclosed by the web 254. Further, where a plurality of chambers 252 is included, a first chamber 252a is separated from an adjacent chamber 252b by a portion of the web 254 (See also FIGS. 9 and 10). As described herein, the chambers 252 can contain a fissionable fuel composition (or other compositions, such as moderator materials and poisons) and the web 254 functions as cladding for the fissionable fuel composition or other compositions.

Similar to the inner segment body 210, the intermediate segment body 240 can include one or more coolant openings 258 that can be located between the chamber 252 or the plurality of chambers 252a, 252b in one intermediate cladding arm 244 and the plurality of chamber 252 or the plurality of chambers 252a, 252b in an adjacent intermediate cladding arm 244. The coolant openings 258 extend through the intermediate cladding arm 244 in the direction of the thickness of the intermediate segment body 240 from a first side 204" of the intermediate segment body 240 to a second side 206" of the intermediate segment body 240.

Also, similar to the inner segment body 210, the coolant openings 258 associated with the intermediate segment body 240 can be of various forms (although the coolant openings 258 associated with the intermediate segment body 240 can be the same or can be different from the coolant openings 230 in the inner segment body 210). For example, where the web 254 of the intermediate segment body 240 is a unitary body, the coolant openings are one or more passages, channels or other openings that can be formed in the web during initial web manufacturing, e.g., during the layer-by-layer deposition process of an additive manufacturing process, or can be formed in the web, post-web manufacturing, by a material removal process such as drilling, milling, plunge milling, or using an electrical discharge machining (EDM) process. In another example, where each intermediate cladding arm 244 is formed as a unitary body and the plurality of intermediate cladding arms 244 are joined to form the intermediate segment body 240, the coolant openings 258 can be passages or other openings that are formed by surface features in the edges of the intermediate cladding arms 244, i.e., the edges bounded by the surface of the intermediate cladding arm 244 forming the first side 204" of the intermediate segment body 240, the surface of the intermediate cladding arm 244 forming the second side 206" of the intermediate segment body 240, the surface of the second radially inner end 246 of the intermediate cladding arm 244, and the surface of the second radially outer end 250 of the intermediate cladding arm 244. In this regard, the edges of the cladding arm 244 can include grooves, ribs, or other surface features that, when contacted by an edge of an adjacent intermediate cladding arm 244, form one or more passages, channels or other openings. In this regard, the edges of the intermediate cladding arm 244 can include any of the surface features described and/or shown herein with regard to the inner cladding arm 214 and FIG. 6C. When present, in some embodiments, such surface features can be offset along the radially extending length of the intermediate cladding arm 244 such that the location of the surface features are not coincident to the portion of the web 254 separating a first chamber 252a from an adjacent chamber 252b. Combinations of different coolant openings can also be implemented.

In some embodiments, it is preferred that the intermediate segment body 240 is formed as a unitary body so as to avoid a weld or other structure on the surface 260 forming the inner diameter of the opening 248 that would otherwise be present from joining individual intermediate cladding arms 244 or groups of intermediate cladding arms 244. In some embodiments, one or both of the surface 260 forming the inner diameter of the opening 248 and the outer edge 256 of the intermediate segment body 240 can be a smooth surface (as seen for surface 260) or can be a ridged with a series of peaks and valleys (as seen for the surface of the outer edge 256). The form of the surface 260 forming the inner diameter of the opening 248 and of the surface of the outer edge 256 can be complementary to the surface to which they about within the assembled layer 200. However, if not fully complementary, a gap may exist that can function as a coolant channel or an adapter structure can be used to mate non-conforming surfaces at the interface. For example, the first interior interface can include a plurality of secondary coolant channels that traverse the active core structure from the first end to the second end. Alternatively, if these surfaces are not fully complementary, an adapter structure can be used to mate non-conforming surfaces at the interface. As a further alternative, a combination of secondary coolant channels and adapter structures can be implemented.

For ease of viewing the involute curve shape of the intermediate cladding arm, an embodiment of an intermediate cladding arm 244 is outlined in FIG. 7A. In the illustrated embodiment, the two curving sides 262a, 262b of the involute curve shape of the intermediate cladding arm 244 are located at a line connecting the mid-points in the web 254 located between the chamber 252 or plurality of chambers 252a, 252b in one intermediate cladding arm 244 and the chamber 252 or plurality of chambers 252a, 252b in an adjacent intermediate cladding arm 244. The involute curve shape itself may be of constant width (i.e., where width is the distance between the two opposing curving sides 262a, 262b of the involute curve shape of the intermediate cladding arm 244) as a function of location along an axis of the involute curve shape extending from a midpoint of the second radially inner end 246 to a midpoint of the second radially outer end 250. Alternatively, the involute curve shape may be of varying width as a function of location along an axis of the involute curve shape extending from the midpoint of the second radially inner end 246 to the midpoint of the second radially outer end 250. For example, the involute curve shape may be of a constantly increasing width or constantly decreasing width as a function of location along an axis of the involute curve shape extending from the midpoint of the second radially inner end 246 to the midpoint of the second radially outer end 250.

Figure 8A:
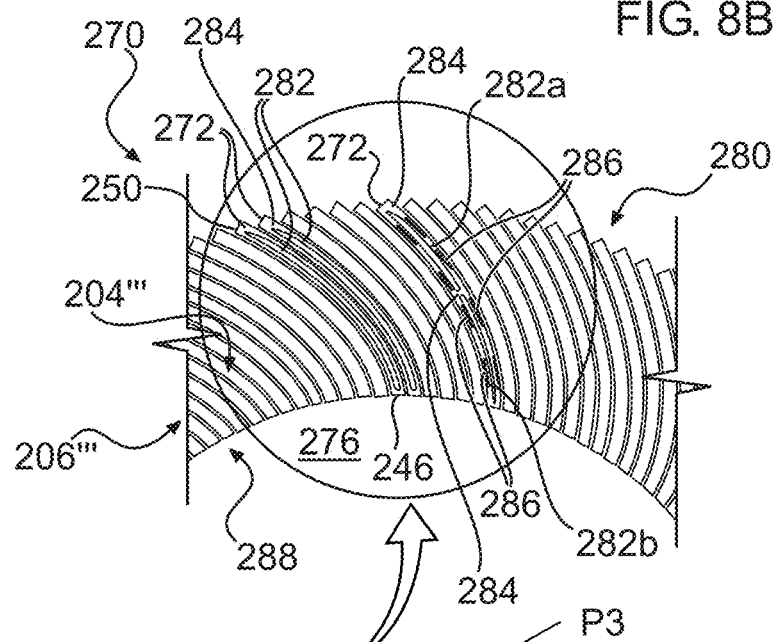
FIG. 8A schematically illustrates in a top view an embodiment of an outer segment body and FIG. 8B shows a magnified view of a portion of the outer segment body shown in FIG. 8A.
Figure 8B:
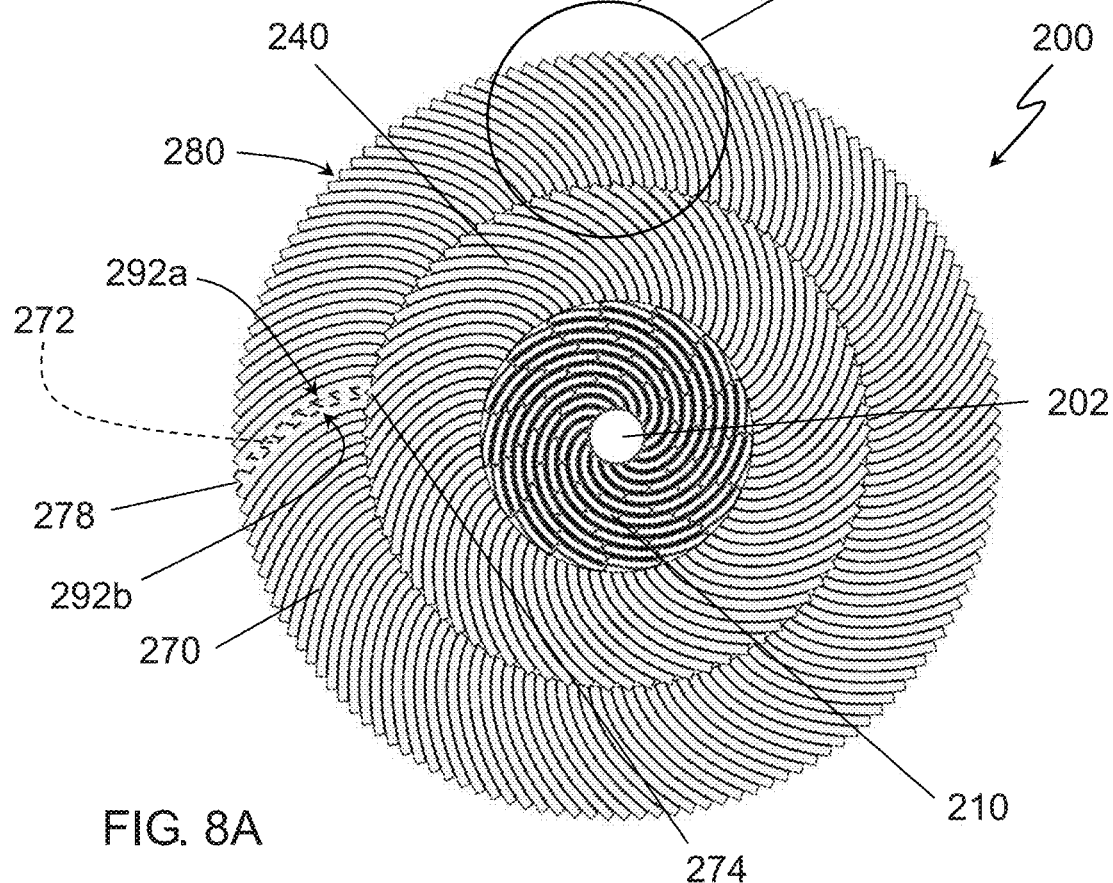

FIG. 8A shows an embodiment of an outer segment body 270, in a top view relative to the outer segment body 270 and in a cross-sectional, plan view relative to an assembled nuclear fission reactor structure, in each case in a plane perpendicular to an axis of the axially extending inner opening 202. FIG. 8B shows a magnified view of a portion P3 of outer segment body 270 shown in FIG. 8A.

The outer segment body 270 includes a plurality of outer cladding arms 272 having a third involute curve shape that spirally radiates outward from a third radially inner end 274 adjacent to an inner opening 276, which will form or be part of the second interior interface 242 in the assembled layer 200, to a third radially outer end 278 at the outer edge 280, which will form or be part of the radially outermost edge in the assembled layer 200 (or, if additional segment bodies are included beyond the three depicted, will form or be part of a further interface in the assembled layer 200). The plurality of outer cladding arms 272 include at least one chamber 282, alternatively a plurality of chambers 282a, 282b (see also, e.g., FIGS. 9 and 10). In FIG. 8B, the chambers 282 are only shown in two outer cladding arms 272, but additional outer cladding arms 272, alternatively all the outer cladding arms 272, can include one or more chambers 282. The chamber 282 extends along the length of the outer cladding arm 272 or, where a plurality of chambers is included, the chambers 282a, 282b are distributed along the length of the outer cladding arm 272. The chamber 282 (or, where a plurality of chambers is included, the chambers 282a, 282b) is contained within a web 284 of the material that forms the outer segment body 270 such that, in each outer cladding arm 272, the individual chamber 282 is enclosed by the web 284. Further, where a plurality of chambers 282 is included, a first chamber 282a is separated from an adjacent chamber 282b by a portion of the web 284 (See also FIGS. 9 and 10). As described herein, the chambers 282 can contain a fissionable fuel composition (or other compositions, such as moderator materials and poisons) and the web 284 functions as cladding for the fissionable fuel composition or other compositions.

Similar to the inner segment body 210 and intermediate segment body 240, the outer segment body 270 can include one or more coolant openings 286 that can be located between the chamber 282 or the plurality of chambers 282a, 282b in one outer cladding arm 272 and the chamber 282 or the plurality of chambers 282a, 282b in an adjacent outer cladding arm 272. The coolant openings 286 extend through the outer cladding arm 272 in the direction of the thickness of the outer segment body 270 from a first side 204''' of the outer segment body 270 to a second side 206''' of the outer segment body 270.

Also, similar to the inner segment body 210 and intermediate segment body 240, the coolant openings 286 associated with the outer segment body 270 can be of various forms (although the coolant openings 286 associated with the outer segment body 270 can be the same or can be different from one or more of the coolant openings 258 in the intermediate segment body 240 and the coolant openings 230 in the inner segment body 210). For example, where the web 284 of the outer segment body 270 is a unitary body, the coolant openings are one or more passages, channels or other openings that can be formed in the web during initial web manufacturing, e.g., during the layer-by-layer deposition process of an additive manufacturing process, or can be formed in the web, post-web manufacturing, by a material removal process such as drilling, milling, plunge milling, or using an electrical discharge machining (EDM) process. In another example, where each outer cladding arm 272 is formed as a unitary body and the plurality of outer cladding arms 272 are joined to form the outer segment body 270, the coolant openings 286 can be passages or other openings that are formed by surface features in the edges of the outer cladding arms 272, i.e., the edges bounded by the surface of the outer cladding arm 272 forming the first side 204''' of the outer segment body 270, the surface of the outer cladding arm 272 forming the second side 206''' of the outer segment body 270, the surface of the third radially inner end 274 of the outer cladding arm 272 and the surface of the third radially outer end 278 of the outer cladding arm 272. In this regard, the edges of the outer cladding arm 272 can include grooves, ribs, or other surface features that, when contacted by an edge of an adjacent outer cladding arm 272, form one or more passages, channels or other openings. In this regard, the edges of the intermediate cladding arm 244 can include any of the surface features described and/or shown herein with regard to the inner cladding arm 214 and FIG. 6C. When present, in some embodiments, such surface features can be offset along the radially extending length of the outer cladding arm 272 such that the location of the surface features are not coincident to the portion of the web 284 separating a first chamber 282a from an adjacent chamber 282b. Combinations of different coolant openings can also be implemented.

In some embodiments, one or both of the surface 288 forming the inner diameter of the opening 276 and the outer edge 280 of the outer segment body 270 can be a smooth surface (as seen for surface 288) or can be a ridged with a series of peaks and valleys (as seen for the surface of the outer edge 280). The form of the surface 288 forming the inner diameter of the opening 276 can be complementary to the surface to which they abut within the assembled layer 200. Also, if a further segment body is radially outward of the outer segment body 270, then the form of the surface of the outer edge 280 can be complementary to the surface to which it abuts within an assembled layer 200. However, if these surfaces are not fully complementary, a gap may exist that can function as a coolant channel. For example, the second interior interface can include a plurality of secondary coolant channels that traverse the active core structure from the first end to the second end. Alternatively, if these surfaces are not fully complementary, an adapter structure can be used to mate non-conforming surfaces at the interface. As a further alternative, a combination of secondary coolant channels and adapter structures can be implemented.

For ease of viewing the involute curve shape of the outer cladding arm, an embodiment of an outer cladding arm 244 is outlined in FIG. 8A. In the illustrated embodiment, the two curving sides 292a, 292b of the involute curve shape of the outer cladding arm 272 are located at a line connecting the mid-points in the web 284 located between the chamber 282 or plurality of chambers 282a, 282b in one outer cladding arm 272 and the chamber 282 or plurality of chambers 282a, 282b in an adjacent intermediate cladding arm 272. The involute curve shape itself may be of constant width (i.e., where width is the distance between the two opposing curving sides 292a, 292b of the involute curve shape of the outer cladding arm 244) as a function of location along an axis of the involute curve shape extending from a midpoint of the third radially inner end 274 to a midpoint of the third radially outer end 278. Alternatively, the involute curve shape may be of varying width as a function of location along an axis of the involute curve shape extending from the midpoint of the third radially inner end 274 to the midpoint of the third radially outer end 278. For example, the involute curve shape may be of a constantly increasing width or constantly decreasing width as a function of location along an axis of the involute curve shape extending from the midpoint of the third radially inner end 274 to the midpoint of the third radially outer end 278.

Figure 9:
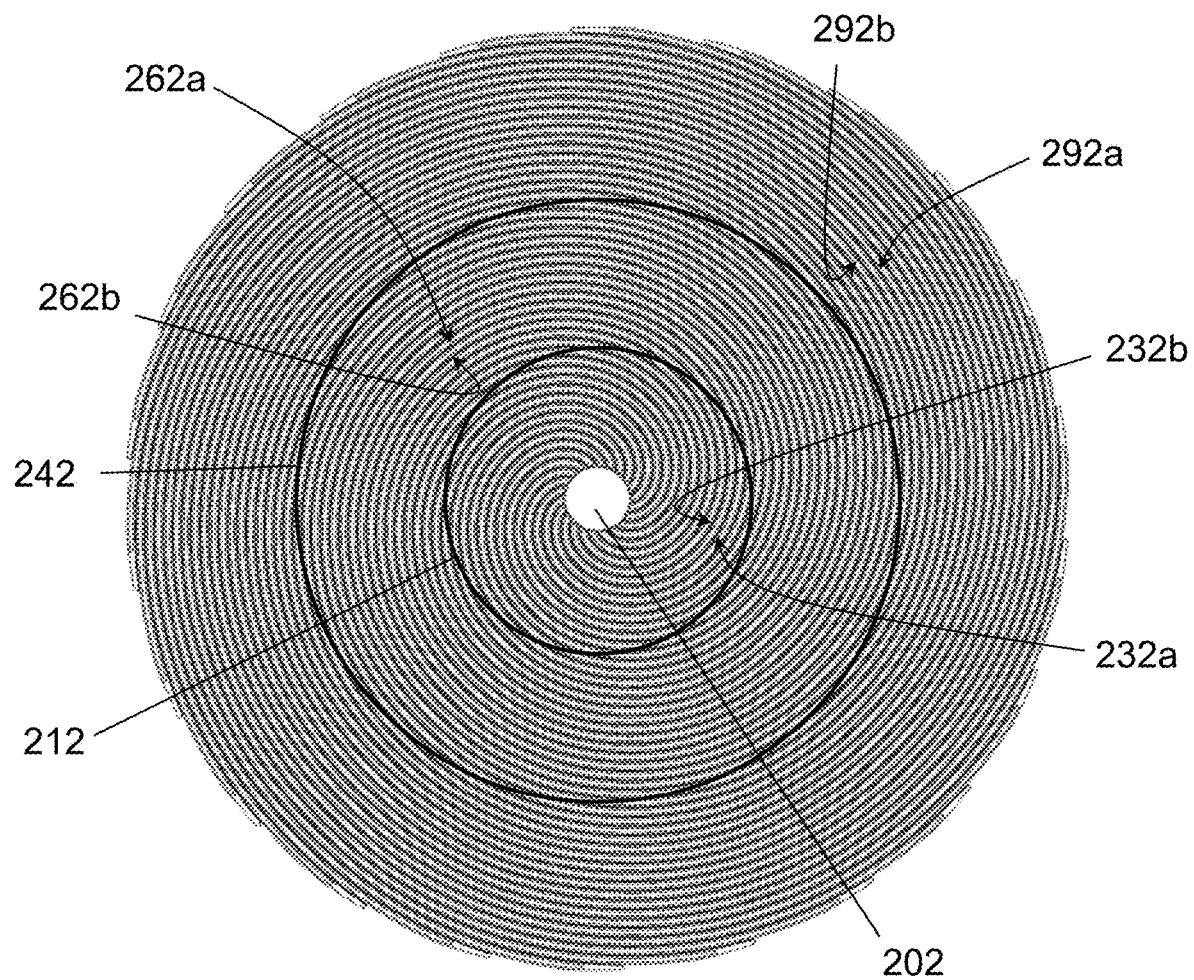
FIG. 9 illustrates an example where surfaces of the involute shaped curve of the cladding arms are continuous across the inner segment body, the intermediate segment body, and the outer segment body.

In some embodiments, when considered collectively, the first involute curve shape, the second involute curve shape, and the third involute curve shape share a common involute curve shape and, therefore, the surfaces of the inner cladding arm, the surfaces of the intermediate cladding arm, and the surfaces of outer cladding arm form a continuous involute curve shape extending from the inner opening to the radially outer surface of the outer segment body. For example and as seen in FIG. 9, when surfaces of the curving sides 232a, 232b of the first involute curve shape of the inner cladding arm are projected across the first interior interface 212, the projection is coincident with the surfaces of the curving sides 262a, 262b of the second involute curve shape of the intermediate cladding arm. As a result, there is one, continuous involute curve shape that contains the surfaces of the curving sides 232a, 232b of the first involute curve shape of the inner cladding arm and the surfaces of the curving sides 262a, 262b of the second involute curve shape of the intermediate cladding arm. As a further example, when the continuous involute curve shape described above is further projected across the second interior interface 242, the projection is also coincident with the surfaces of the curving sides 292a, 292b of the third involute curve shape of the outer cladding arm. As a result of this further projection, there is one, continuous involute curve shape that contains the surfaces of the curving sides 232a, 232b of the first involute curve shape of the inner cladding arm, the surfaces of the curving sides 262a, 262b of the second involute curve shape of the intermediate cladding arm, and the surfaces of the curving sides 292a, 292b of the third involute curve shape of the outer cladding arm. Also as seen in FIG. 9, each of the first involute curve shape, the second involute curve shape, and the third involute curve shape correspond to different portions of the continuous involute curve shape extending from the inner opening to the radially outer surface of the outer segment body.

In other embodiments, the surfaces of the curving sides 232a, 232b of the first involute curve shape of the inner cladding arm, the surfaces of the curving sides 262a, 262b of the second involute curve shape of the intermediate cladding arm, and the surfaces of the curving sides 292a, 292b of the third involute curve shape of the outer cladding arm correspond to the curvature of a continuous involute curve shape, but one or more of the segment bodies is rotated relative to an adjacent segment body. If rotated less than a quantized value that would maintain alignment of the surfaces, the rotation results in the surfaces of the curving sides being rotationally offset from the projection of the continuous involute curve shape. In such an arrangement, the surfaces of the curving sides of the involute curve shape of the cladding arm on either side of the relevant affected interface are discontinuous in that they are connected by a step change.

In still other embodiments, when considered collectively, the first involute curve shape, the second involute curve shape, and the third involute curve shape have different curvatures. Therefore, the surfaces of the inner cladding arm, the surfaces of the intermediate cladding arm, and the surfaces of outer cladding arm form a discontinuous involute curve shape extending from the inner opening to the radially outer surface of the outer segment body. Such an embodiment is illustrated in the example layer 200 illustrated in FIG. 5.

Although, in some embodiments, some or all of the surfaces of the inner cladding arm, the surfaces of the intermediate cladding arm, and the surfaces of outer cladding arm form a discontinuous involute curve shape, such surfaces are still collectively radially spiraling in the same direction, i.e., either in a right-handed (clockwise) direction (as seen in FIG. 5) or in a left-handed (counter-clockwise) direction.

In still further embodiments, one or more (but less than all) of the first involute curve shape, the second involute curve shape, and the third involute curve shape share a common involute curve shape. Therefore, some of the surfaces of the inner cladding arm, the surfaces of the intermediate cladding arm, and the surfaces of outer cladding arm form a continuous involute curve shape extending across their respective surfaces while other of the surfaces of the inner cladding arm, the surfaces of the intermediate cladding arm, and the surfaces of outer cladding arm form a discontinuous involute curve shape extending across their respective surfaces.

Figure 10:
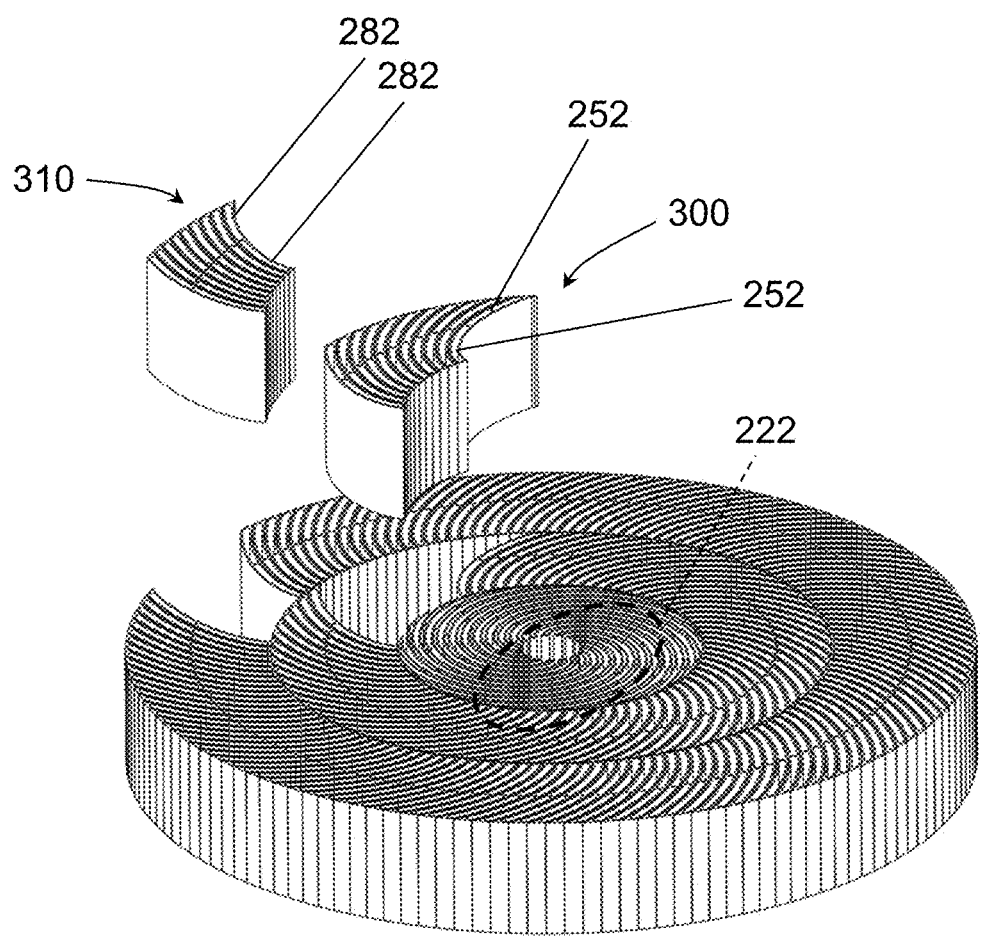
FIG. 10 illustrate an example of a layer in which the inner cladding arms each can contain six chambers and the intermediate cladding arms and the plurality of outer cladding arms each contain two chambers FIG. 11 schematically illustrates an example of a cladding arm.

In the embodiments shown and described in FIGS. 6A-B, 7A-B, and 8A-B, each of the plurality of inner cladding arms, the plurality of intermediate cladding arms, and the plurality of outer cladding arms can, independently, include one or more chambers. In some embodiments, the inner cladding arms have more chambers than in any either the intermediate cladding arms or the outer cladding arms. For example and as illustrated in FIG. 5, the inner cladding arms in the inner segment body 210 each can contain six chambers 222 (see also chambers 222 in FIG. 6A) and the intermediate cladding arms and the plurality of outer cladding arms each contain one chamber (252 and 282, respectively) (see also chambers 252 in FIG. 7B and chambers 282 in FIG. 8B). As another example and as illustrated in FIG. 10, the inner cladding arms each can contain six chambers 222 (see also chambers 222 in FIG. 6A) and the intermediate cladding arms and the plurality of outer cladding arms each contain two chambers (252 and 282, respectively). In exemplary embodiments, the total number of chambers in one inner cladding arm, one intermediate cladding arm, and one outer cladding arm is ten or less.

FIG. 10 also illustrates alternative embodiments of the intermediate segment body 240 and the outer segment body 270. In the alternative embodiments, a plurality of cladding arms are manufactured as unit, such as unit 300 including a plurality of intermediate cladding arms and unit 310 including a plurality of outer cladding arms. Manufacturing cladding arms as a unit is advantageous when utilizing additive manufacturing processes. Furthermore when manufactured as a unit, the units can use less material to form the web (at least in part because adjacent cladding arms can have less web material between any chambers contained in those adjacent cladding arms as compared to separate cladding arms that are then positioned adjacent to each other) and can minimize the number of welded joints needed to assembly a complete segment body.

As previously noted, in the various examples of the cladding arm, the individual chambers are enclosed by the web. Typically, during manufacturing, the web forms the sides and bottom of the chamber and one side of the chamber, such as the top, is initially open to allow loading of a fissionable fuel composition (or other compositions, such as moderator materials and poisons). Subsequent to loading, the one open side of the chamber is then closed by way of a cap being attached to the web.

Figure 11:
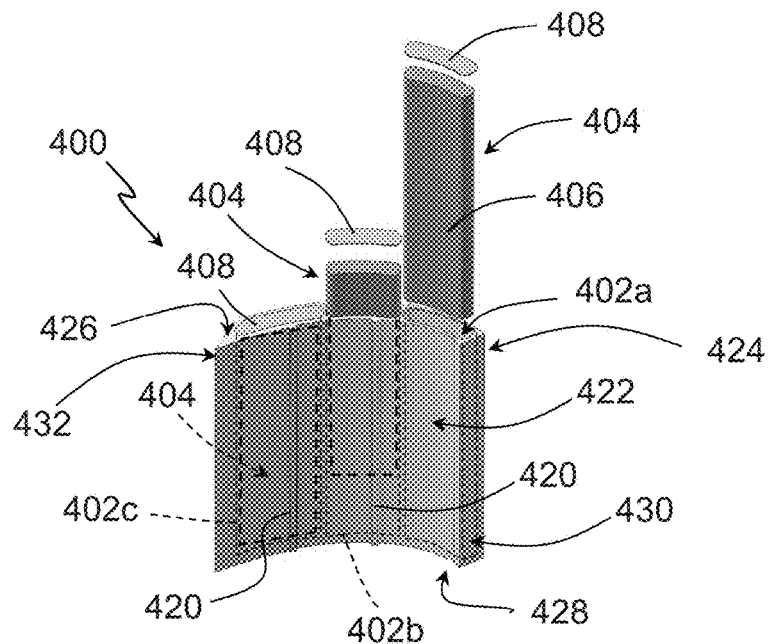

FIG. 11 schematically illustrates an example of a cladding arm 400. In the example cladding arm 400, several features discussed herein are shown. For example, the example cladding arm 400 has a plurality of chambers (in the illustrated embodiment, three chambers 402a, 402b, 402c). Also shown is a fuel composition 404. The fuel composition 404 is shown at different points in the loading process. In one example, the fuel composition 404 is an already formed body 406 having dimensions suitable for insertion into the chamber, such as chamber 402a. Suitable dimensions includes the body 406 being sized to have thermal transfer contact between the outer surfaces of the body 406 of the fuel composition 404 and the interior surfaces of the chamber 402. Alternatively, the body 406 has a minimal stand-off distance between the outer surfaces of the body 406 of the fuel composition 404 and the interior surfaces of the chamber 402 and a thermal transfer agent, such as a salt or metal that will be molten at operating temperatures, is also loaded into the chamber 402. Also, the volume of the body 406 is sufficiently smaller than the volume of the chamber 402 to accommodate the by-products of the fission reaction and of operating at elevated temperature, such as a volume to accommodate fission gases and any change in volumes from the fission reaction as well as from any thermal expansion. As seen in association with chamber 402b, the body 406 of the fuel composition is inserted into the chamber and, as seen in association with chamber 402c, a cap 408 closes the chamber, for example, by welding the cap to the portion of the web forming the periphery of the opening of the chamber. Once closed by the cap 408, the chamber is isolated from the environment and the fuel composition 404 is enclosed by the web of the cladding arm 400 (or, if the cap is considered not part of the web after closing the chamber, enclosed by the combination of the web of the cladding arm 400 and the cap).

Another example feature shown in the embodiment of the cladding arm 400 are the surface features 420 one edge 422 of the cladding arm 400. As previously described, either one or both of the edges 422, 424 are bounded by the surface 426 of the cladding arm 400 that forms/will form the first side of the segment body, the surface 428 of the cladding arm 400 that forms/will form the second side of the segment body, the surface 430 of the radially inner end of the cladding arm 400, and the surface 432 of the radially outer end of the cladding arm 400. In the illustrated example in FIG. 11, the surface feature 420 is a rib that extends above the surface of edge 422. As can be readily understood from FIG. 11, when the edge 422 is contacted by an edge of an adjacent cladding arm, the surface feature 420 will cause the portion of the edge 422 to be off set from the edge of an adjacent cladding arm by a distance that corresponds to the distance that the surface feature 420 extends above the surface of edge 422, thereby forming a channel extending from the surface 426 of the cladding arm 400 that forms/will form the first side of the segment body to the surface 428 of the cladding arm 400 that forms/will form the second side of the segment body.

Figure 12:
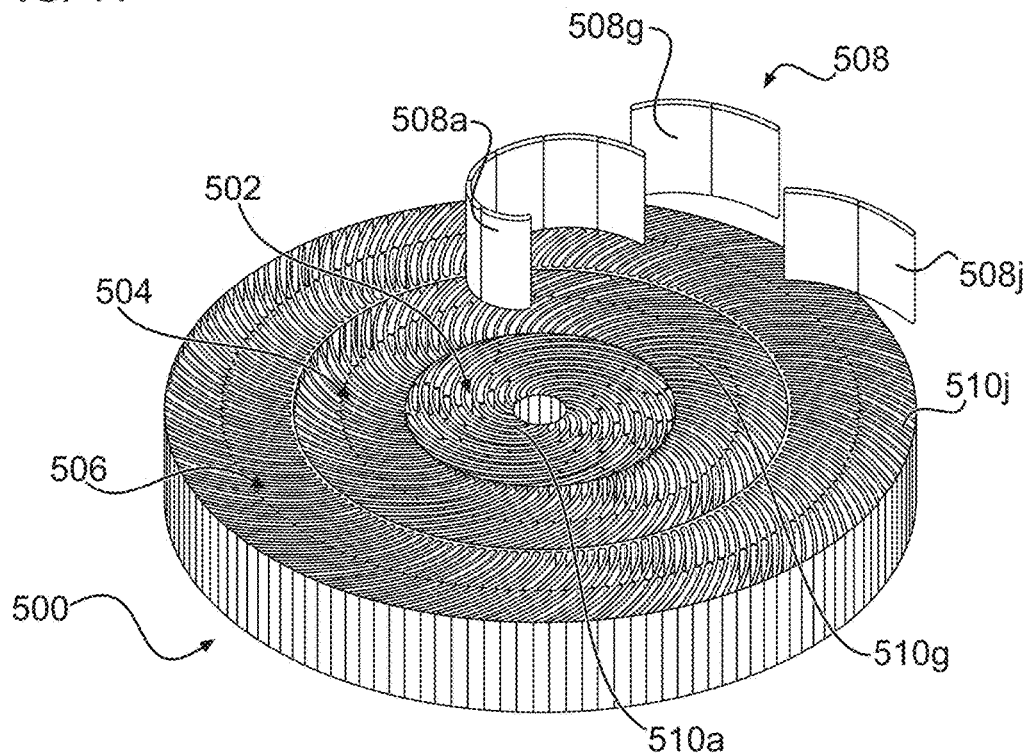
FIG. 12 shows an embodiment of a layer including an inner body segment 502, an intermediate segment body 504, and an outer segment body, each of which having a plurality of chambers and, located above each segment body, a plurality of fuel composition bodies.

FIG. 12 shows a layer 500 including an inner body segment 502, an intermediate segment body 504, and an outer segment body 506. Each body segment has a plurality of chambers. Located above each segment body are a plurality of fuel composition bodies 508, corresponding in shape (including involute curve shape) and number to the chambers present in the respective segment body in which the fuel composition body will be loaded. For example, fuel composition body 508a will be loaded into the radially inward chamber 510a in the inner segment body 502, fuel composition body 508g will be loaded into the radially inward chamber 510g in the intermediate segment body 504, and fuel composition body 508j will be loaded into the radially outward chamber 510*j* in the outer segment body 506. Furthermore, in some embodiments the fuel composition in each fuel composition body varies, resulting in chambers at different locations along the cladding arm containing different fissionable fuel compositions.

Although shown and described in FIGS. 11 and 12 with respect to a fuel composition, one or more of the instances in which a fuel composition is loaded into a chamber can be substituted by a moderator material composition or a poison composition, or mixtures of a moderator material composition or a poison composition. Such a substitution can be done in accordance with a reactor neutronics design and a thermal management design.

FIGS. 13A and 13B shows results of thermal analysis studies on the involute curve shape cladding arm design disclosed herein. Thermal analysis was conducted based on a fission reactor containing such an involute curve shape cladding arm design. The involute curve shape cladding arm design in FIG. 13A shows a cladding arm 600 (corresponding to an embodiment of an inner segment body cladding arm) having a first set of six fuel composition bodies 602, a cladding arm 604 (corresponding to an embodiment of an intermediate segment body cladding arm) having a second set of four fuel composition bodies 606, and with a cladding arm 608 (corresponding to an embodiment of an outer segment body cladding arm) having a third set of four fuel composition bodies 610. Overall, the thermal analysis demonstrated that there is adequate cooling on both sides of the cladding arms of each segment body to prevent the fuel composition in the chambers from melting.

Amongst the cladding arms and fuel compositions in FIG. 13A, thermal analysis indicated that temperature ranged from about 1256.3 K (for cladding at the concave surface 620 and at tip 622) to up to 2504.6 K for the hottest temperature elevation, which occurred in the region of the inner segment body cladding arm located toward the radially outer end (corresponding to Section P4 in FIG. 13A and shown in magnified view in FIG. 13B as regions 630*a* and 630*b*). Region 630*a* is associated with the fuel composition body in chamber 602*e* and occurs on curved edge of the inner segment body cladding arm with a temperature of between 2227.2 K and 2504.6 K. This result was interpreted as the fuel composition body in chamber 602*e* expanding during operation and causing an increase in curvature of the fuel composition body resulting in the fuel composition body to no longer contact the inner surface of chamber 602*e* in the region 630*a*. Because of this gap formed between the fuel composition body and the inner surface of chamber 602*e*, the heat transfer decreased and the temperature increased. Note that this test did not include a thermal transfer agent, such as a salt or liquid metal buffer, the presence of which would be expected to fill the gap and improve heat transfer and reduce the temperature in region 620. However, the portion 622 of the web collocated with region 620 maintains a much lower temperature of between 1256.3 K and 1395 K.

The involute curve shape cladding arms, segmented bodies and layers disclosed herein can be manufactured by any suitable process. FIGS. 14A-D is a flow diagram graphical illustrating exemplary steps in the assembly of a layer from the various portions of the segmented bodies (FIG. 14A-B, the loading of a fuel composition and/or moderator composition and poisons into the layer (FIG. 14C), and the assembly of multiple layers into a nuclear fission reactor structure (FIG. 14D).

In a first manufacturing process, the involute curve shape cladding arms 700 containing a plurality of chambers and wherein a web of the involute curve shape cladding arms defines the cladding structure is manufactured by metallurgical processes. These metallurgical processes, in one example, include an additive manufacturing process. It is preferred that the structure of the inner segment body 702 be made as a unitary structure (as shown in FIG. 14A) to minimize joints on the inner diameter surface of the opening. Furthermore, using suitable additive manufacturing processes, the entire structure of a layer 720, including the features of an inner segment body 702, an intermediate segment body 704 and an outer segment body 706 structure of the inner segment body 702, can made as a unitary structure.

In other aspects, the involute curve shape cladding arms forming the intermediate segment body 704 and the involute curve shape cladding arms forming the outer segment body 706 can be manufactured individually and joined into the layer or, as shown in FIG. 14A, as a unitary body forming units that are joined into the layer 720 (See FIG. 14B).

Other structures of the involute curve shape cladding arms, such as the chambers, and the coolant openings, are typically manufactured at this point in the process. As for the chambers in each of the involute curve shape cladding arms, they are initially manufactured (either in the additive manufacturing process or by machining the material of the involute curve shape cladding arms) to a point where an opening remains defining the chamber, i.e., a cavity having side walls and one closed end.

Joining the involute curve shape cladding arms to form the layer 720 (FIG. 14B) can be by any suitable means, including welding and bonding.

After forming the layer 720, the chambers are loaded with the fissionable fuel composition 742 (or other material such as a moderator or poison) (see FIG. 14C, wherein the loading process is indicated by arrows). If desired, a thermal transfer agent is also placed into the chamber. Once the chamber is loaded, a cap is placed over the opening and is sealed, for example, by welding or by a hot isostatic pressing (HIP) process, to form the assembled involute curve shape cladding arm.

A plurality of assembled layers 740 are then further assembled into a nuclear fission reactor structure 780 as shown in FIG. 14D. The layers are arranged one on top of the other with corresponding internal structures, such as coolant openings. As previously disclosed, clocking techniques using projecting registry features can be used for alignment purposes. In an example construction, up to 10 layers 740 can be assembled to form the nuclear fission reactor structure 780. Assembly of the layers 740 is by any suitable means, such as welding or bonding. In addition, a plate 782 can be placed on either end of the nuclear fission reactor structure 780. The plate can have suitable openings for, for example, to correspond to the coolant openings, to correspond to the inner opening, and/or to correspond to openings for instrumentation. The assembled nuclear fission reactor structure 780 is placed within a radial reflector 784. A radial reflector is optional based on fuel materials and core design.

In some manufacturing methods or steps in manufacturing methods, portions of the involute curve shape cladding arms, the segment bodies, and/or the layers are manufactured as an integral, unitary structure using, for example, an additive manufacturing process. As used herein, additive manufacturing processes include any technologies that build 3D objects by adding material on a layer-upon-layer basis. An example of a suitable additive manufacturing process utilizes 3-D printing of a metal alloy, such as a molybdenum-containing metal alloy, Zircalloy-4 or Hastelloy X, to form the noted structural features. In other embodiments, the fissionable nuclear fuel composition and/or the thermal transfer agent and/or the moderator materials and/or poisons can be included within the integral, unitary structure when suitable multi-material, additive manufacturing processes with multiple metals within the feedstock are employed. If the molten metal is not included in the additive manufacturing process, the additive manufacturing process can be paused, a volume of molten metal placed into the fuel cavity (either in liquid or solid form) and the additive manufacturing process continued to complete the structure of the closed chamber. Other alloys that can be used when suitable multi-material, additive manufacturing processes with multiple metals within the feedstock are employed include: steel alloys, zirconium alloys, and Molybdenum-Tungsten alloys (for the shell of the reactor core); beryllium alloys (for the reflector); and stainless steel (for the containment housing). Even when not manufactured by an additive manufacturing process, the above materials can be used in manufacturing the various structures disclosed herein.

Additive manufacturing techniques for the manufacture of integral and unitary structures can include the additional steps of: (a) predictive and causal analytics, (b) in-situ monitoring combined with machine vision and accelerated processing during the layer-by-layer fabrication of the structure, (c) automated analysis combined with a machine learning component, and (d) virtual inspection of a digital representation of the as-built structure. In addition, additive manufacturing technology can create complex geometries and, when coupled with in-situ sensors, machine vision imagery, and artificial intelligence, allows for tuning of the manufacturing quality as the components are built on a layer-by-layer additive basis (often, these layers are on the scale of 50 microns) and provides predictive quality assurance for the manufacture of such reactors and structures.

As used herein, cladding is the outer layer of fuel containing features and is located between the coolant and the nuclear fuel. The cladding functions as a safety barrier that prevents radioactive fission fragments from escaping the fuel into the coolant and contaminating it. Some design constraints of cladding include neutron absorption, radiation resistance and temperature behavior. The cladding is typically made of a corrosion-resistant material with low absorption cross section for thermal neutrons. Example materials include Zircaloy or steel, although other materials may be used if suitable to the reactor conditions, such as metallic and ceramic systems (Be, C, Mg, Zr, O, and Si). In some embodiments, the cladding material can be isotope enriched to enhance reactive through reduction of isotopes with higher neutron absorption cross-sections, e.g., molybdenum enriched Mo-92 will have a less parasitic neutron absorption cross-section than elemental molybdenum.

A suitable fissionable nuclear fuel composition applicable to the disclosed fission reactor and to be included in the heat generating source includes uranium oxide that is less than 20% enriched, uranium with 10 wt. % molybdenum (U-10Mo), uranium nitride (UN), and other stable fissionable fuel compounds. Burnable poisons may also be included. Typically, the fissionable nuclear fuel composition is in the form of a ceramic material.

Suitable molten metals for inclusion in the disclosed fission reactor and to be included in the fuel cavity is sodium (Na), sodium-potassium (NaK), potassium (K), and iron (Fe).

It is contemplated that various supporting and ancillary equipment can be incorporated into the disclosed fission reactor. For example, at least one of a moderator (such as a zirconium hydride (ZrH), beryllium oxide (BeO), water and graphite), a control rod (such as iridium control rod), and a scientific instrument (such as a temperature sensor or radiation detector), as well as isotope production equipment, can be incorporated into the fission reactor. Additionally, the control rods can also incorporate a neutron poison which absorbs neutrons and can be used to regulate the criticality of nuclear reactors. The neutron poison can absorb enough neutrons to shut down the fission reactor (e.g., when the control rods are completely inserted into the reactor space) or can be axially positioned to maintain criticality of the fission reactor (e.g., when the control rods are withdrawn from the reactor core a distance to allow a continuous fission chain reaction). Any suitable number of control rods and moderators can be used and suitably distributed throughout the reactor space in order to obtain one or more of a desired flux profile, power distribution, and operating profile. In exemplary embodiments, the control rods are threaded, which contribute to save axial space, maximizes control rod diameter, and allows for direct roller nut contact for reliable SCRAM operation. All or a subset of control rods can be individually controlled by independent motors to provide discrete reactivity control and/or for power shaping.

Figure 15:
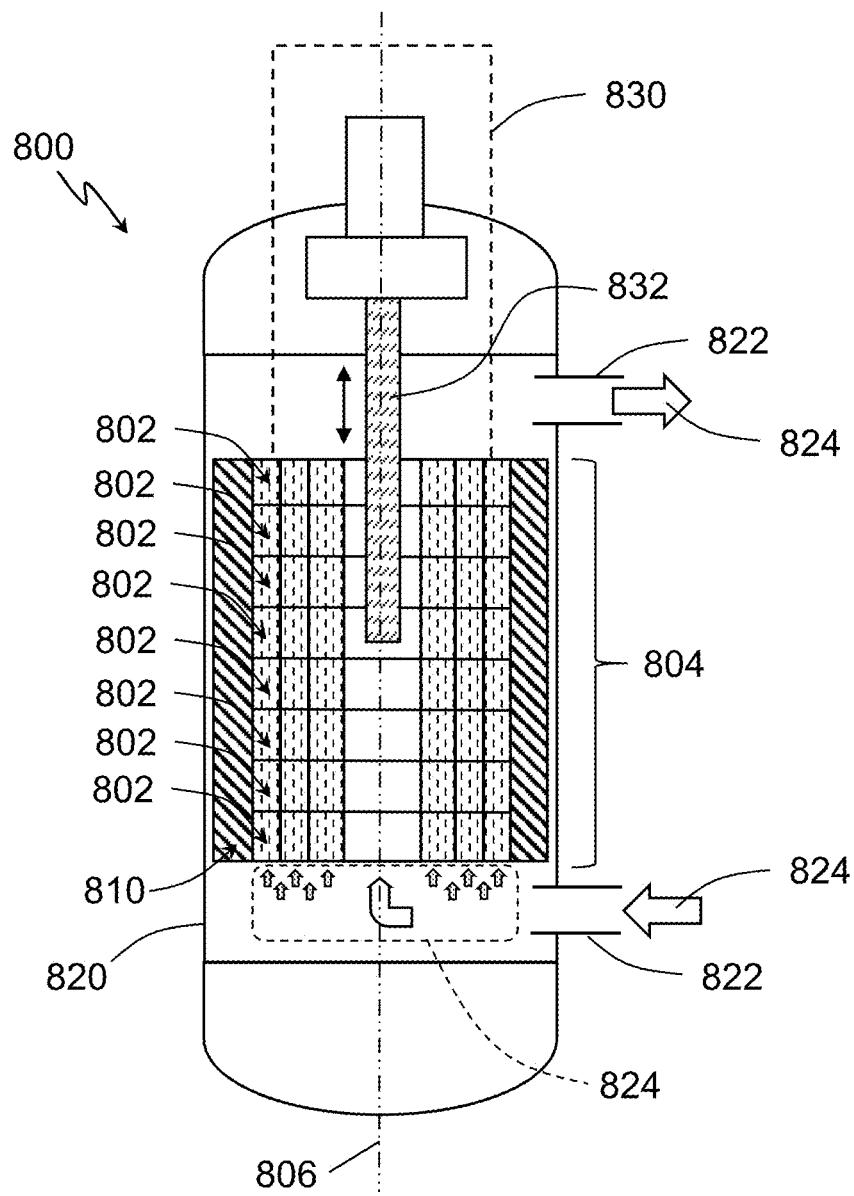
FIG. 15 schematically illustrates in cross-sectional side view an embodiment of a nuclear fission reactor comprising a plurality of layers assembled into a nuclear fission reactor structure.

FIG. 15 schematically illustrates in cross-sectional side view an embodiment of a nuclear fission reactor 800 comprising a plurality of layers 802 assembled into a nuclear fission reactor structure 804 and arranged along a longitudinal axis 806 of the nuclear fission reactor structure 804. The layers 802 are defined by an inner segment body, an intermediate segment body, an outer segment body, a first interior interface, and a second interior interface as previously disclosed and described in embodiments herein. The nuclear fission reactor 800 also comprises a radial reflector 810 positioned about the outer side surface of the nuclear fission reactor structure 804. The nuclear fission reactor structure 804 can be any suitable geometric shape as long as it displays suitable neutronic and thermal management characteristics. As noted herein, exemplary embodiments have sufficient layers 802 so that the ratio of the length of the active core region ($L_{RX}$) to the diameter of the active core structure ($D_{RX}$) is approximately 1

$$\left(\text{i.e., } \frac{L_{RX}}{D_{RX}} = 1 \pm .05\right).$$

In general, the radial reflector 810 reduces the neutron leakage of the nuclear fission reactor 800 by scattering back into the core (or reflecting) neutrons that would otherwise escape, which increases the effective multiplication factor ($k_{eff}$) of the design and reduces the amount of fuel necessary to maintain criticality. A pressure vessel 820 encloses, among other things, the nuclear fission reactor structure 804 and has openings 822 to allow the active core structure to be in fluid communication (the flow of coolant being indicated by arrows 824) with a coolant system (not shown). Some of the various ancillary equipment associated with nuclear fission reactors are also shown in FIG. 15, including a control rod assembly 830 and shut down equipment, such as poison rod 832 which can be moved axially within the inner opening of the nuclear fission reactor structure 804. As previously disclosed and described in embodiments herein, any suitable radial reflector, pressure vessel and coolant system can be incorporated into the nuclear fission reactor 800.

The disclosed arrangements pertain to any configuration in which a heat generating source including a fissionable nuclear fuel composition, whether a fuel element or the fissionable nuclear fuel composition per se, is surrounded by cladding. Although generally described herein in connection with a pressurized water reactor (PWR reactors) and with water as a primary coolant, the structures and methods disclosed herein can also be applicable to other reactor systems. This includes boiling water reactors (BWR reactors), deuterium oxide (heavy water) moderator reactors such as CANDU reactors, light water reactors (LWR reactors), pebble bed reactors (PBR reactors), nuclear thermal propulsion reactors (NTP reactors), both commercial and research reactors, and utilize other primary coolants, such as helium, hydrogen, methane, molten salts, and liquid metals. Any fuel-to-clad configuration in these various reactors may produce better nuclear core safety and performance characteristics if the molten metal fuel buffer technique disclosed herein is utilized.

Fission reactors disclosed herein can be used in suitable applications including, but not limited to, terrestrial power sources, remote power or off-grid applications, space power, space propulsion, isotope production, directed energy applications, commercial power applications, and desalination.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A nuclear fission reactor structure comprising a plurality of layers, wherein each layer of the plurality of layers includes:
   an inner segment body including an inner opening extending axially from a first side of the inner segment body to a second side of the inner segment body;
   an intermediate segment body radially outward of the inner segment body;
   an outer segment body radially outward of the intermediate segment body;
   a first interior interface separating the inner segment body and the intermediate segment body; and
   a second interior interface separating the intermediate segment body and the outer segment body,
   wherein, in a cross-sectional plan view in a plane perpendicular to the axially extending inner opening:
      the inner segment body includes a plurality of inner cladding arms having a first involute curve shape that spirally radiates outward from a first radially inner end adjacent to the inner opening to a first radially outer end at the first interior interface,
      the intermediate segment body includes a plurality of intermediate cladding arms having a second involute curve shape that spirally radiates outward from a second radially inner end adjacent to the first interior interface to a second radially outer end at the second interior interface, and
      the outer segment body includes a plurality of outer cladding arms having a third involute curve shape that spirally radiates outward from a third radially inner end adjacent to the second interior interface to a third radially outer end at a radially outer surface of the outer segment body,
   wherein each of the first involute curve shape, the second involute curve shape, and the third involute curve shape have a different curvature, and
   wherein, collectively, the first involute curve shape, the second involute curve shape, and the third involute curve shape form an involute curve shape extending from the inner opening to the radially outer surface of the outer segment body.

2. The nuclear fission reactor structure according to claim 1, wherein a projection of a surface of the involute curve shape extends across the first interior interface and the second interior interface and is coincident with each of a surface of one of the plurality of inner cladding arms, a surface of one of the plurality of intermediate cladding arms, and a surface of one of the plurality of outer cladding arms.

3. The nuclear fission reactor structure according to claim 1, wherein each of the first involute curve shape, the second involute curve shape, and the third involute curve shape correspond to different portions of a continuous the involute curve shape extending from the inner opening to the radially outer surface of the outer segment body.

4. The nuclear fission reactor structure according to claim 3, wherein a projection of a surface of the involute curve shape extends across the first interior interface and the second interior interface and is coincident with each of a surface of one of the plurality of inner cladding arms, a surface of one of the plurality of intermediate cladding arms, and a surface of one of the plurality of outer cladding arms.

5. The nuclear fission reactor structure according to claim 1, wherein, in the involute curve shape, a radially outward end of a first inner cladding arm of the plurality of inner cladding arms contacts a radially inward end of a first intermediate cladding arm of the plurality of intermediate cladding arms, and a radially outward end of the first intermediate cladding arm contacts a radially inward end of a first outer cladding arm of the plurality of outer cladding arms.

6. The nuclear fission reactor structure according to claim 1, wherein each of the plurality of inner cladding arms, the plurality of intermediate cladding arms, and the plurality of outer cladding arms include a plurality of chambers.

7. The nuclear fission reactor structure according to claim 6, wherein the plurality of chambers in each cladding arm of the plurality of inner cladding arms, the plurality of intermediate cladding arms, and the plurality of outer cladding arms are separated from each other by a web.

8. The nuclear fission reactor structure according to claim 6, wherein a number of the plurality of chambers in each inner cladding arm of the plurality of inner cladding arms is larger than a number of the plurality of chambers in each outer cladding arm of the plurality of outer cladding arms.

9. The nuclear fission reactor structure according to claim 6, wherein the plurality of chambers is ten or less.

10. The nuclear fission reactor structure according to claim 6, wherein a number of the plurality of chambers in each intermediate cladding arm of the plurality of intermediate cladding arms and a number of the plurality of chambers in each outer cladding arm of the plurality of outer cladding arms are the same.

11. The nuclear fission reactor structure according to claim 6, wherein the plurality of chambers include one of a fissionable fuel composition and a moderator material.

12. The nuclear fission reactor structure according to claim 11, wherein chambers at different locations along the cladding arm contain different fissionable fuel compositions.

13. The nuclear fission reactor structure according to claim 11, wherein chambers at different locations along the cladding arm contain different moderator material.

14. The nuclear fission reactor structure according to claim 11, wherein, when a fissionable fuel composition is located in a chamber, there is a space between at least a portion of one interior surface wall of the chamber and at least a portion of one exterior surface of a body formed of the fissionable fuel composition.

15. The nuclear fission reactor structure according to claim 1, wherein the inner cladding arms have opposing side surfaces extending from the first side of the inner segment body to the second side of the inner segment body, and wherein at least one protrusion projects outwardly from at least one opposing side surface.

16. The nuclear fission reactor structure according to claim 15, wherein each protrusion extends along the at least one opposing side surface continuously from a first end oriented toward the first side of the inner segment body to a second end oriented toward the second side of the inner segment body.

17. The nuclear fission reactor structure according to claim 15, wherein each protrusion extends along the at least one opposing side surface discontinuously from a first end oriented toward the first side of the inner segment body to a second end oriented toward the second side of the inner segment body.

18. The nuclear fission reactor structure according to claim 15, wherein the protrusion has a top surface distal from the at least one opposing side surface for which the protrusion projects, and wherein, when assembled in the inner segment body with a first inner cladding arm immediately adjacent a second inner cladding arm, the top surface of a protrusion on the first inner cladding arm contacts an opposing side surface on the second inner cladding arm and forms a channel between the first inner cladding arm and the second inner cladding arm.

19. The nuclear fission reactor structure according to claim 1, wherein the inner segment body, the intermediate segment body, the outer segment body, the first interior interface, and second interior interface define a layer.

20. A nuclear fission reactor, comprising:
a plurality of layers according to claim 19, wherein the plurality of layers are assembled into a nuclear fission reactor structure with a first end surface, a second end surface, and an outer side surface connecting the first end surface to the second end surface;
a radial reflector positioned about the outer side surface of the nuclear fission reactor structure;
a pressure vessel; and
a coolant system in fluid communication with the nuclear fission reactor structure through openings in the pressure vessel.

21. The nuclear fission reactor according to claim 20, wherein the nuclear fission reactor structure has a cylindrical structure.

22. The nuclear fission reactor according to claim 20, wherein the coolant system is fluid-based or gas-based.

23. The nuclear fission reactor according to claim 20, wherein the first interior interface and the second interior interface in each of the plurality of layers include a plurality of secondary coolant channels that traverse the nuclear fission reactor structure from the first end to the second end.

24. The nuclear fission reactor according to claim 6, wherein the plurality of chambers in each inner cladding arm of the plurality of cladding arms include a first portion of chambers containing a fissionable fuel composition and a second portion of chambers containing a moderator material, and
wherein in each inner cladding arm:
chambers of the first portions of chambers at different locations along the inner cladding arm contain different fissionable fuel compositions, and
chambers of the second portions of chambers at different locations along the inner cladding arm contain different moderator material.

25. The nuclear fission reactor structure according to claim 1, wherein the intermediate cladding arms have opposing side surfaces extending from the first side of the intermediate segment body to the second side of the intermediate segment body, and wherein at least one protrusion projects outwardly from at least one opposing side surface.

26. The nuclear fission reactor structure according to claim 1, wherein the outer cladding arms have opposing side surfaces extending from the first side of the outer segment body to the second side of the outer segment body, and wherein at least one protrusion projects outwardly from at least one opposing side surface.

* * * * *